(12) United States Patent
Hutchings et al.

(10) Patent No.: US 10,746,060 B2
(45) Date of Patent: Aug. 18, 2020

(54) THERMODYNAMIC CYCLE APPARATUS AND METHOD

(71) Applicant: Futurebay Limited, Greater Manchester (GB)

(72) Inventors: Adrian Charles Hutchings, Greater Manchester (GB); Iain James Henshaw, Greater Manchester (GB)

(73) Assignee: Futurebay Limited, Greater Manchester (GB)

( * ) Notice: Subject to any disclaimer, the term of this patent is extended or adjusted under 35 U.S.C. 154(b) by 0 days.

(21) Appl. No.: 16/325,777

(22) PCT Filed: Aug. 4, 2017

(86) PCT No.: PCT/GB2017/052313
§ 371 (c)(1),
(2) Date: Feb. 15, 2019

(87) PCT Pub. No.: WO2018/033700
PCT Pub. Date: Feb. 22, 2018

(65) Prior Publication Data
US 2019/0211714 A1     Jul. 11, 2019

(30) Foreign Application Priority Data
Aug. 15, 2016   (GB) .................... 1613952.9

(51) Int. Cl.
*F01K 23/04*     (2006.01)
*F01K 3/12*      (2006.01)
*F01K 23/02*     (2006.01)

(52) U.S. Cl.
CPC ............... *F01K 23/04* (2013.01); *F01K 3/12* (2013.01); *F01K 23/02* (2013.01); *Y02E 20/16* (2013.01)

(58) Field of Classification Search
CPC ..... F01K 3/12; F01K 3/14; F01K 3/16; F01K 17/005; F01K 23/00; F01K 23/02;
(Continued)

(56) References Cited

U.S. PATENT DOCUMENTS

| | | | | |
|---|---|---|---|---|
| 5,809,791 A | * | 9/1998 | Stewart, III | F01K 25/08 60/655 |
| 9,038,390 B1 | * | 5/2015 | Kreuger | F01K 23/02 60/655 |

(Continued)

FOREIGN PATENT DOCUMENTS

GB    2535181 A    8/2016

OTHER PUBLICATIONS

International Search Report and Written Opinion dated Jan. 30, 2018, for corresponding International Application No. PCT/GB2017/052313; International Filing Date: Aug. 4, 2017, consisting of 13-pages.

(Continued)

*Primary Examiner* — Mark A Laurenzi
*Assistant Examiner* — Mickey H France
(74) *Attorney, Agent, or Firm* — Christopher & Weisberg, P.A.

(57) ABSTRACT

A thermodynamic cycle apparatus is provided. The thermodynamic cycle apparatus includes: (i) a first reservoir containing a first storage medium; (ii) a second reservoir containing a second storage medium; (iii) a heat pump having a cold side thermally coupled to the first reservoir for cooling the first storage medium and a hot side thermally coupled to the second reservoir for heating the second storage medium; (iv) a first thermodynamic circuit of a first working fluid; (v) a second thermodynamic circuit of a second working fluid; (vi) an auxiliary heat input thermally connected to the first thermodynamic circuit so that auxiliary (Continued)

heat may contribute to the creation of the first pressurized vapor; and (vii) an auxiliary heat output thermally connected to the second thermodynamic circuit so that the second working fluid can lose heat to an auxiliary heat sink.

27 Claims, 10 Drawing Sheets

(58) Field of Classification Search
CPC .......... F01K 23/04; F01K 23/08; F01K 25/06; F01K 25/08; F28D 20/00–028; Y02E 60/14–145; Y02E 20/16
USPC ......... 60/614–618, 645, 657, 659, 662, 663, 60/667, 670, 671, 676, 678, 655
See application file for complete search history.

(56) References Cited

U.S. PATENT DOCUMENTS

| | | | |
|---|---|---|---|
| 9,394,807 B1 | 7/2016 | Kreuger | |
| 9,989,278 B1* | 6/2018 | Kreuger | F28D 15/00 |
| 2008/0022683 A1* | 1/2008 | Ohler | F02C 6/14 |
| | | | 60/641.8 |
| 2008/0022713 A1* | 1/2008 | Jacobi | F24F 5/0017 |
| | | | 62/434 |
| 2009/0250189 A1* | 10/2009 | Soukhojak | C09K 5/063 |
| | | | 165/10 |
| 2010/0252232 A1* | 10/2010 | Reich | F28D 20/0034 |
| | | | 165/48.1 |
| 2010/0257862 A1 | 10/2010 | Howes et al. | |
| 2010/0281889 A1* | 11/2010 | Reich | F24F 5/0017 |
| | | | 62/66 |
| 2011/0252796 A1* | 10/2011 | Burkhart | F01K 27/00 |
| | | | 60/641.2 |
| 2012/0168111 A1* | 7/2012 | Soukhojak | F28D 20/023 |
| | | | 165/10 |
| 2013/0019598 A1* | 1/2013 | Tamaura | F01K 25/10 |
| | | | 60/641.8 |
| 2013/0056170 A1* | 3/2013 | Klemencic | F03G 6/067 |
| | | | 165/10 |
| 2013/0111903 A1* | 5/2013 | Stiesdal | F28D 20/0056 |
| | | | 60/659 |
| 2013/0125546 A1* | 5/2013 | Barmeier | F01K 13/006 |
| | | | 60/643 |
| 2013/0299123 A1* | 11/2013 | Matula | F03G 7/04 |
| | | | 165/45 |
| 2014/0298813 A1* | 10/2014 | Brunhuber | F01K 13/006 |
| | | | 60/645 |
| 2015/0000248 A1* | 1/2015 | del Omo | F01K 3/00 |
| | | | 60/39.182 |
| 2015/0114019 A1* | 4/2015 | Van Gysel | F24D 17/001 |
| | | | 62/238.7 |
| 2015/0136351 A1 | 5/2015 | Reznik et al. | |
| 2015/0218969 A1* | 8/2015 | Reznik | F01K 1/08 |
| | | | 60/651 |
| 2016/0161158 A1 | 6/2016 | Gill | |
| 2016/0377303 A1* | 12/2016 | Staffend | F01C 13/04 |
| | | | 165/45 |
| 2017/0248040 A1* | 8/2017 | Verma | F01K 23/04 |
| 2018/0187627 A1* | 7/2018 | Apte | F02C 1/05 |
| 2018/0328235 A1* | 11/2018 | Eliyahu | F01K 25/06 |
| 2018/0372337 A1* | 12/2018 | Walker | F24D 11/002 |
| 2019/0161366 A1* | 5/2019 | Al-Azazmeh | B01D 3/42 |
| 2019/0211714 A1* | 7/2019 | Hutchings | F01K 23/02 |
| 2019/0331006 A1* | 10/2019 | Eliyahu | F02B 53/02 |

OTHER PUBLICATIONS

Corrected IPO Search Report dated Jan. 26, 2017, for corresponding Application No. GB1613952.9; Filing Date: Aug. 15, 2016, consisting of 1-page.

International Preliminary Report on Patentability dated Feb. 19, 2019, for corresponding International Application No. PCT/GB2017/052313; International Filing Date: Aug. 4, 2017 consisting of 9-pages.

* cited by examiner

THERMODYNAMIC CYCLE APPARATUS AND METHOD

CROSS-REFERENCE TO RELATED APPLICATIONS

This application is a Submission under 35 U.S.C. § 371 for U.S. National Stage Patent Application of, and claims priority to, International Application Number PCT/GB2017/052313 entitled THERMODYNAMIC CYCLE APPARATUS AND METHOD, filed Aug. 4, 2017, which is related to and claims priority to Great Britain Patent Application Number 1613952.9, filed Aug. 15, 2016, the entirety of all of which are incorporated herein by reference.

This invention relates to a thermodynamic cycle apparatus and method, which, in particular, may be used for energy storage and/or waste heat storage and recovery of waste heat into useful energy.

BACKGROUND

In the field of electricity generation, there is often a mismatch between supply of electricity and the demand for the electricity at any given time.

As an example, it is often more efficient to continuously run power stations as opposed to intermittently running them to match demand. However, given that demand for electrical energy continuously fluctuates (particularly at night when demand drops significantly) supply of electrical power from the power station may frequently exceed the level of demand. As a further example, renewable power generators often produce fluctuating levels of energy due to the unpredictable and changeable nature of renewable sources (e.g. wind power, wave power, solar intensity etc.) and this time dependent output seldom matches the demand. Thus, there is a need for energy storage systems that may be used to store energy produced by electricity generators (e.g. when demand for such energy is low), and subsequently be capable of converting stored energy back into electrical energy (e.g. when demand increases).

Several energy storage systems are known and these include systems that convert electrical energy into thermal energy which is subsequently stored for later use.

Pumped-storage hydroelectricity (PSH) is currently the most effective energy storage solution available on a large scale. However, PSH requires a mountain and lake/reservoir in order to benefit from its high round trip efficiency. Other large scale energy storage solutions have been mooted, though they often require other geographically constrained features (e.g. salt caverns), complicated cryogenic plants and batteries (which not only have a limited effective life making their economics questionable, but also require climate controlled environments which adds a parasitic loss and presents significant safety issues) or have high costs associated with decommissioning and disposal of hazardous materials at end of life.

Many industrial and commercial processes produce waste energy in the form of heat. The ability to capture this waste heat and convert it in to usable power has both financial and environmental benefits. There is therefore a need to both store energy and/or capture waste heat.

It is an object of certain embodiments of the present invention to overcome certain disadvantages associated with the prior art.

It is an object of certain embodiments of the present invention to store energy and/or capture waste heat and convert the waste heat into useful energy.

BRIEF SUMMARY OF THE DISCLOSURE

In accordance with an aspect of the present invention there is provided a thermodynamic cycle apparatus comprising:
(i) a first reservoir containing a first storage medium;
(ii) a second reservoir containing a second storage medium;
(iii) a heat pump having a cold side thermally coupled to the first reservoir for cooling the first storage medium and a hot side thermally coupled to the second reservoir for heating the second storage medium;
(iv) a first thermodynamic circuit of a first working fluid, the first thermodynamic circuit comprising:
  a first evaporator for evaporating the first working fluid to create a first pressurised vapour;
  a first expander arranged to expand the first pressurised vapour; and
  a first condenser arranged to condense first working fluid received from the first expander and provide first working fluid to the first evaporator, the first condenser being thermally coupled to the first reservoir;
(v) a second thermodynamic circuit of a second working fluid, the second thermodynamic circuit comprising:
  a second evaporator for evaporating the second working fluid to create a second pressurised vapour, the second evaporator being thermally coupled to the second reservoir;
  a second expander arranged to expand the second pressurised vapour; and
  a second condenser arranged to condense second working fluid received from the second expander and provide second working fluid to the second evaporator;
(vi) an auxiliary heat input means thermally connected to the first thermodynamic circuit so that auxiliary heat may contribute to the creation of the first pressurised vapour; and
(vii) an auxiliary heat output means thermally connected to the second thermodynamic circuit so that the second working fluid can lose heat to an auxiliary heat sink;
wherein the first thermodynamic circuit is thermally independent of the second thermodynamic circuit, and the apparatus is operable in a charging mode, a storage mode, and a discharge mode;
wherein in the charging mode the heat pump is energised to cool the first storage medium and heat the second storage medium;
in the storage mode cooled first storage medium is stored in the first reservoir and heated second storage medium is stored in the second reservoir; and
in the discharge mode, the first pressurised vapour is expanded by the first expander and/or the second pressurised vapour is expanded by the second expander.

In certain embodiments, either or both of the first expander and second expander may comprise one of a turbine, scroll expander, screw expander, Tesla turbine, or a reciprocating engine. Additionally or alternatively, either or both of the first expander and second expander may comprise an expander-generator for generating electricity.

Either or both of the first and second thermodynamic circuits may include a pump for circulating first or second working fluid. The first condenser may be arranged to provide first working fluid to the first evaporator via the pump of the first thermodynamic circuit and/or the second condenser may be arranged to provide second working fluid to the second evaporator via the pump of the second thermodynamic circuit. The pump of the first thermodynamic circuit and/or the pump of the second thermodynamic circuit may be selected from: a centrifugal pump, a sliding vane pump, a gerotor pump, a geroller pump, a gear pump, a diaphragm pump, a piston pump, a plunger pump, a peristaltic pump, or a lobe pump. The apparatus may comprise a plurality of pumps, where the plurality of pumps are mounted on a common shaft. Either or both of the first expander and second expander may be mounted on a common shaft, which may be the common shaft of one or more of the pumps.

The apparatus may further comprise an auxiliary heat source for providing the auxiliary heat to the first thermodynamic circuit via the auxiliary heat input means. The auxiliary heat source may comprise one or more of: an external ambient air source, an air source from inside a building, heat rejected from an air conditioning or refrigeration system, an ambient water source, a ground source, a geothermal source, a solar thermal source, a solar pond, a biologically active heat source, waste heat from an industrial process, and waste heat from generation technology.

The apparatus may further comprise an auxiliary heat sink for receiving heat from the second thermodynamic circuit via the auxiliary heat output means. The auxiliary heat sink may comprise one or more of: an external ambient air source, an air source from inside a building, an ambient water source, a ground source, and waste cooling sources.

The second thermodynamic circuit may comprise an additional auxiliary heat input means so that additional auxiliary heat may contribute to the creation of the second pressurised vapour. The apparatus may further comprise an additional auxiliary heat source for providing the additional auxiliary heat to the second thermodynamic circuit via the additional auxiliary heat input means.

The apparatus may further comprise a first superheater between the first evaporator and the first expander, the first superheater being arranged to superheat the first working fluid.

The apparatus may further comprise a second superheater between the second evaporater and the second expander, the second superheater being arranged to superheat the second working fluid.

The apparatus may further comprise a preheater between the second condenser and the second evaporator, the preheater being configured to heat the second working fluid.

Either or both of the first storage medium and the second storage medium may comprise an encapsulated phase change material or an unencapsulated phase change material.

The cold side of the heat pump may be thermally coupled to the first reservoir by a first heat transfer circuit of a first heat transfer fluid. The first storage medium may comprise an unencapsulated phase change material, and the first heat transfer fluid may not be miscible in the first storage medium.

The hot side of the heat pump may be thermally coupled to the second reservoir by a second heat transfer circuit of a second heat transfer fluid. The second storage medium may comprise an unencapsulated phase change material, and the second heat transfer fluid may not be miscible in the second storage medium.

The first reservoir may be thermally coupled to the condenser of the first thermodynamic circuit by a third heat transfer circuit of a third heat transfer fluid. The third heat transfer fluid may be the same as the first heat transfer fluid.

The second reservoir may be thermally coupled to the evaporator of the second thermodynamic circuit by a fourth heat transfer circuit of a fourth heat transfer fluid. The fourth heat transfer fluid may be the same as the second heat transfer fluid.

In certain embodiments, the heat pump may comprise a refrigeration circuit of a refrigerant. The refrigeration circuit may include a refrigeration compressor, a refrigeration evaporator, a refrigeration condenser or gas cooler, and a refrigeration expansion means for expanding the refrigerant, wherein the cold side of the heat pump comprises the refrigeration evaporator and the hot side of the heat pump comprises the refrigeration condenser or gas cooler. The refrigeration expansion means may comprise a refrigeration expansion valve or a refrigerant expander.

The first storage medium and/or the second storage medium may comprise a liquid that does not change phase during operation of the apparatus any of the charging mode, the storage mode, and the discharge mode. The apparatus may comprise means to agitate and/or recirculate the first storage medium to homogenise the temperature within the first reservoir and inhibit stratification and/or comprising means to agitate and/or recirculate the second storage medium to homogenise the temperature within the second reservoir and inhibit stratification.

The first reservoir and/or second reservoir may each comprise an initial vessel and a secondary vessel. The first storage medium may be a liquid that is transferable from the initial first vessel to the secondary first vessel when the apparatus is operated in the charging mode, and is transferable from the secondary first vessel to the initial first vessel when the apparatus is operated in the discharge mode. The second storage medium may be a liquid that is transferable from the initial second vessel to the secondary second vessel when the apparatus is operated in the charging mode, and is transferable from the secondary second vessel to the initial second vessel when the apparatus is operated in the discharge mode.

The apparatus may further comprise one or more heat exchangers arranged in the first reservoir and/or the second reservoir.

The apparatus may further comprise an additional auxiliary heat sink means arranged so that an additional auxiliary heat sink thermally connected thereto may contribute to the condensing of the first pressurised vapour. The apparatus may further comprise an additional auxiliary heat sink thermally connected to the additional auxiliary heat sink means.

The apparatus may further comprise additional energy storage means arranged to output energy independently of energy outputted by the first expander and second expander. The additional energy storage means may include a capacitor, battery, fly wheel or other non-thermal electrical or mechanical energy storage means.

In certain embodiments, either or both of the first and second thermodynamic circuits may comprise a Rankine cycle, Lorenz cycle or a Kalina cycle.

Either or both of the first and second storage media may be configured to be stored at a temperature between −50° C. and 200° C., or between −30° C. and 100° C.

In accordance with another aspect of the present invention, there is provided a method of operating a thermodynamic cycle apparatus comprising:

(a) providing a thermodynamic cycle apparatus comprising:

(i) a first reservoir containing a first storage medium;

(ii) a second reservoir containing a second storage medium;

(iii) a heat pump having a cold side thermally coupled to the first reservoir for cooling the first storage medium and a hot side thermally coupled to the second reservoir for heating the second storage medium;

(iv) a first thermodynamic circuit of a first working fluid, the first thermodynamic circuit comprising:
  a first evaporator for evaporating the first working fluid to create a first pressurised vapour;
  a first expander arranged to expand the first pressurised vapour; and
  a first condenser arranged to condense first working fluid received from the first expander and provide first working fluid to the first evaporator, the first condenser being thermally coupled to the first reservoir; and (v) a second thermodynamic circuit of a second working fluid, the second thermodynamic circuit comprising:
  a second evaporator for evaporating the second working fluid to create a second pressurised vapour, the second evaporator being thermally coupled to the second reservoir;
  a second expander arranged to expand the second pressurised vapour; and
  a second condenser arranged to condense second working fluid received from the second expander and provide second working fluid to the second evaporator;

(b) operating the apparatus in a charging mode by energising the heat pump to cool the first storage medium and heat the second storage medium;

(c) operating the apparatus in a storage mode by storing cooled first storage medium in the first reservoir and storing heated second storage medium in the second reservoir;

(d) operating the apparatus in a first discharge mode by using an auxiliary heat source to create the first pressurised vapour in the first evaporator, expanding the first pressurised vapour with the first expander and condensing the first working fluid in the first condenser; and (e) operating the apparatus in a second discharge mode by using heat from the second reservoir to create the second pressurised vapour in the second evaporator, expanding the second pressurised vapour and using an auxiliary heat sink to condense the second working fluid in the second condenser;

wherein steps (d) and (e) are performable both concurrently and independently of one another.

Either or both of the first expander and second expander may comprise one of a turbine, scroll expander, screw expander, Tesla turbine, or a reciprocating engine, wherein the turbine may optionally be a radial turbine, an axial turbine, or an impulse turbine.

Either or both of the first expander and second expander may comprise an expander-generator for generating electricity.

Either or both of the first and second thermodynamic circuits may include a pump for circulating first or second working fluid.

The method may comprise using the pump of the first thermodynamic circuit to provide first working fluid from the first condenser to the first evaporator and/or using the pump of the second thermodynamic circuit to provide second working fluid from the second condenser to the second evaporator. The pump of the first thermodynamic circuit and/or the pump of the second thermodynamic circuit may be selected from: a centrifugal pump, a sliding vane pump, a gerotor pump, a geroller pump, a gear pump, a diaphragm pump, a piston pump, a plunger pump, a peristaltic pump, or a lobe pump. The apparatus may comprise a plurality of pumps, where the plurality of pumps are mounted on a common shaft. Either or both of the first expander and second expander may be mounted on a common shaft, which may or may not include one or more of the pumps.

The apparatus may comprise an auxiliary heat source for providing the auxiliary heat to the first thermodynamic circuit via the auxiliary heat input means. The auxiliary heat source may comprise one or more of: an external ambient air source, an air source from inside a building, heat rejected from an air conditioning or refrigeration system, an ambient water source, a ground source, a geothermal source, a solar thermal source, a solar pond, a biologically active heat source, waste heat from an industrial process, and waste heat from generation technology.

The apparatus may comprise an auxiliary heat sink, and the method comprises using the auxiliary heat sink to receive heat from the second thermodynamic circuit via the auxiliary heat output means. The auxiliary heat sink may comprise one or more of: an external ambient air source, an air source from inside a building, an ambient water source, a ground source, and waste cooling sources. The second thermodynamic circuit may comprise an additional auxiliary heat input means so that additional auxiliary heat may contribute to the creation of the second pressurised vapour. The apparatus may comprise an additional auxiliary heat source, and the method may comprise using heat from the auxiliary heat source to contribute to the creation of the second pressurised vapour in any of the charging mode, storage mode, first discharge mode and second discharge mode.

The apparatus may comprise a first superheater between the first evaporator and the first expander, and the method may comprise using the first superheater to superheat the first working fluid.

The apparatus may comprise a second superheater between the second evaporater and the second expander, and the method may comprise using the second superheater to superheat the second working fluid.

The apparatus may comprise a preheater between the second condenser and the second evaporator, and the method may comprise using the preheater to heat the second working fluid.

Either or both of the first storage medium and the second storage medium may comprise an encapsulated phase change material or an unencapsulated phase change material.

The first storage medium may comprise an unencapsulated material and the method may comprise storing the first storage medium as a slurry or a fragmentable solid at an end of operation of the charging mode.

The second storage medium may comprise an unencapsulated material and the method may comprise storing the second storage medium as a slurry or a fragmentable solid at an end of operation of the second discharge mode.

The cold side of the heat pump may be thermally coupled to the first reservoir by a first heat transfer circuit of a first heat transfer fluid. The first storage medium may comprise an unencapsulated phase change material, and the first heat transfer fluid may not be miscible in the first storage medium.

The hot side of the heat pump may be thermally coupled to the second reservoir by a second heat transfer circuit of a second heat transfer fluid. The second storage medium may comprise an unencapsulated phase change material, and the second heat transfer fluid may not be miscible in the second storage medium.

The first reservoir may be thermally coupled to the condenser of the first thermodynamic circuit by a third heat transfer circuit of a third heat transfer fluid. The third heat transfer fluid may be the same as the first heat transfer fluid.

The second reservoir may be thermally coupled to the evaporator of the second thermodynamic circuit by a fourth heat transfer circuit of a fourth heat transfer fluid. The fourth heat transfer fluid may be the same as the second heat transfer fluid.

In certain embodiments, the heat pump may comprise a refrigeration circuit of a refrigerant. The refrigeration circuit may include a refrigeration compressor, a refrigeration evaporator, a refrigeration condenser or a gas cooler, and a refrigeration expansion means for expanding the refrigerant, wherein the cold side of the heat pump comprises the refrigeration evaporator and the hot side of the heat pump comprises the refrigeration condenser or the gas cooler. The refrigeration expansion means may comprise a refrigeration expansion valve or a refrigerant expander.

The first storage medium and/or the second storage medium may comprise a liquid that does not change phase during operation of the apparatus any of the charging mode, the storage mode, and the discharge mode.

The apparatus may comprise means to agitate and/or recirculate the first/second storage medium, and the method may comprise agitating and/or recirculating the first/second storage medium to homogenise the temperature within the first/second reservoir and inhibit stratification during the charging mode.

The first reservoir and/or second reservoir may each comprise an initial vessel and a secondary vessel.

In certain embodiments, the first storage medium may be a liquid and the method may comprise transferring the first storage medium from the initial first vessel to the secondary first vessel when the apparatus is operated in the charging mode, and transferring the first storage medium from the secondary first vessel to the initial first vessel when the apparatus is operated in the discharge mode.

In certain embodiments, the second storage medium may be a liquid and the method may comprise transferring the second storage medium from the initial second vessel to the secondary second vessel when the apparatus is operated in the charging mode, and transferring the second storage medium from the secondary second vessel to the initial second vessel when the apparatus is operated in the discharge mode.

The apparatus may comprise one or more heat exchangers arranged in the first reservoir and/or the second reservoir.

The apparatus may comprise an additional auxiliary heat output means arranged so that an additional auxiliary heat sink thermally connected thereto may contribute to the condensing of the first pressurised vapour. The apparatus may comprise an additional auxiliary heat sink thermally connected to the additional auxiliary heat output means, and the method may comprise using the additional auxiliary heat sink to contribute to the condensing of the first pressurised vapour.

The first thermodynamic circuit may comprise a single-pass heat exchanger, and the method may comprise, when operating the apparatus in the first discharge mode, discharging the first storage medium through the single-pass heat exchanger and allowing the first storage medium to stratify thereafter.

The second thermodynamic circuit may comprise a single-pass heat exchanger, and the method may comprise, when operating the apparatus in the second discharge mode, discharging the second storage medium through the single-pass heat exchanger and allowing the second storage medium to stratify thereafter.

The apparatus may comprise additional energy storage means arranged to output energy independently of energy outputted by the first expander and second expander. The additional energy storage means may include a capacitor, battery, fly wheel or other non-thermal electrical or mechanical energy storage means.

The method may comprise using the additional energy storage means to provide an output of electrical energy until energy outputted by the first and/or second discharge modes reaches a predetermined amount.

The method may comprise driving the first expander and/or second expander prior to introduction of first/second working fluid therein.

The apparatus may comprise first pipework connected to an input of the first expander, and the method may comprise pressurising the first pipework with gaseous first working fluid prior to operation of the first discharge mode.

The apparatus may comprise second pipework connected to an input of the second expander, and the method may comprise pressurising the second pipework with gaseous second working fluid prior to operation of the second discharge mode.

Either or both of the first and second thermodynamic circuits may comprise a Rankine cycle, Lorenz cycle or a Kalina cycle.

The method may comprise storing either or both of the first and second storage media at a temperature between −50° C. and 200° C., or between −30° C. and 100° C. in the storage mode.

BRIEF DESCRIPTION OF THE DRAWINGS

Embodiments of the invention are further described hereinafter with reference to the accompanying drawings, in which.

DETAILED DESCRIPTION

Figure 1:
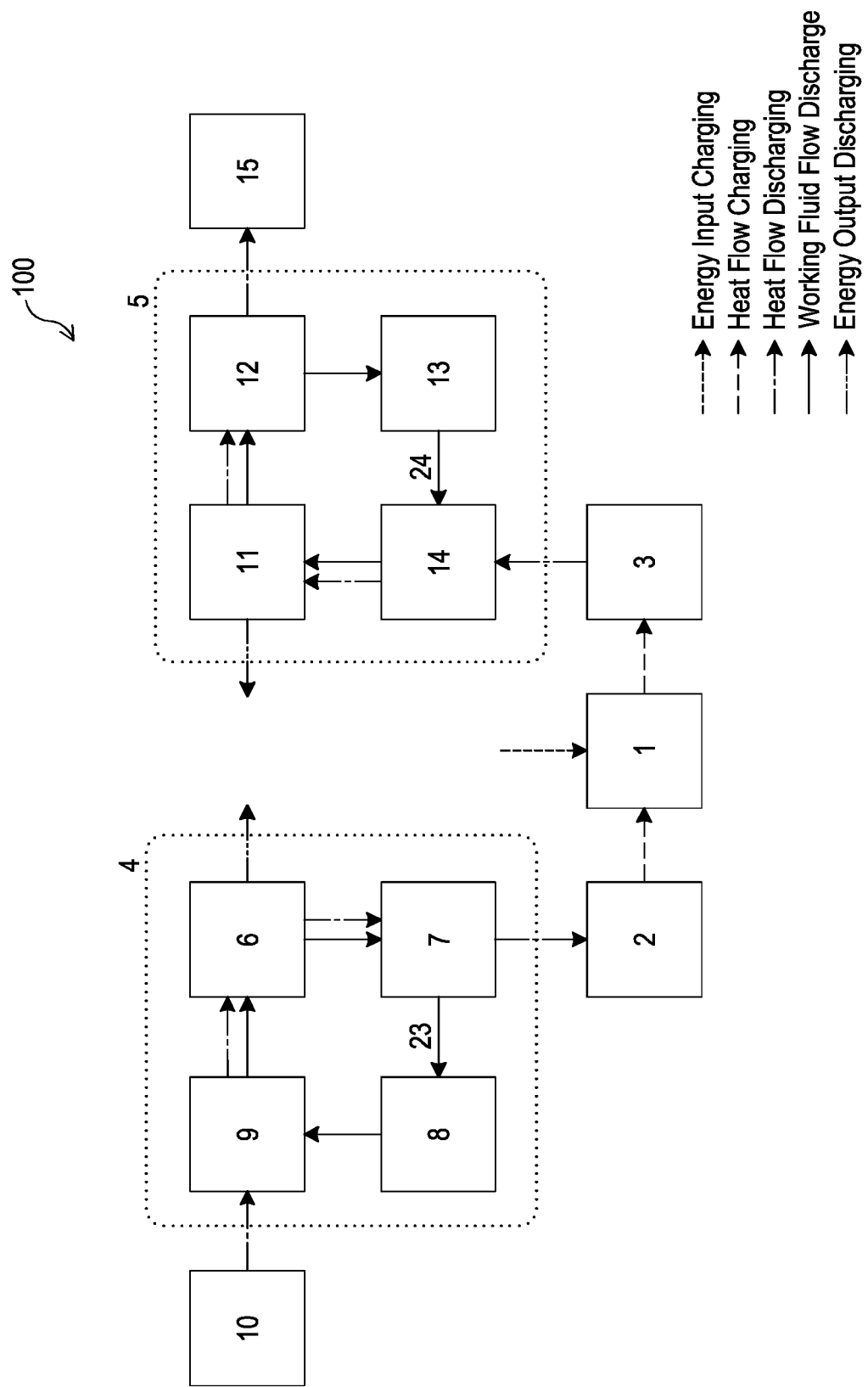
FIG. 1 is a schematic representation of a thermodynamic cycle apparatus according to an embodiment of the present invention.

A thermodynamic cycle apparatus 100 according to an embodiment of the present invention is shown schematically in FIG. 1. The thermodynamic cycle apparatus 100 comprises a first reservoir 2 containing a first storage medium, a second reservoir 3 containing a second storage medium, and a heat pump 1 having a cold side thermally coupled to the first reservoir 2 for cooling the first storage medium and a hot side thermally coupled to the second reservoir 3 for heating the second storage medium.

As is described below in respect of additional embodiments of the invention (shown in FIGS. 3 to 8), the heat pump 1 may be a refrigeration circuit including a refrigeration compressor 19, a refrigeration evaporator 20, a refrigeration condenser 21 and refrigeration expansion means which may be in the form of an expansion valve 22 (or refrigerant expander) and containing a refrigerant. In such embodiments, the cold side of the heat pump 1 may comprise the refrigeration evaporator 20, and the hot side of the heat pump 1 may comprise the refrigeration condenser 21. In alternative embodiments, the heat pump 1 may comprise alternative suitable heat pumps and is not necessarily limited to the specific heat pump described in herein with reference to the Figures. For example, the refrigeration condenser 21 of the above-described refrigeration circuit may be a gas cooler.

The thermodynamic cycle apparatus 100 further comprises a first thermodynamic circuit 4 of a first working fluid 23 and a second thermodynamic circuit 5 of a second working fluid 24.

The first thermodynamic circuit 4 comprises a first evaporator 9, a first expander 6 and a first condenser 7. In the non-limiting embodiments shown in the Figures, the first thermodynamic circuit 4 includes a first pump 8 for pumping the first working fluid 23. However, in alternative embodiments, other means for circulating and creating a pressure differential in the first working fluid 23 may be provided. The first evaporator 9 is arranged to evaporate the first working fluid 23 to create a first pressurised vapour. The first expander 6 is arranged to receive and expand the first pressurised vapour. In certain embodiments, the first expander 6 may be an expander generator capable of generating electrical energy. In alternative embodiments, the first expander 6 may be arranged to provide mechanical work to other components (e.g. a shaft). In certain embodiments, the first expander 6 may be an axial turbine, radial turbine, impulse turbine (or other type of turbine), scroll expander, screw expander, Tesla turbine, or a reciprocating engine. The first condenser 7 is arranged to condense first working fluid received from the first expander 6 and provide first working fluid 23 to the first evaporator 9 (via the first pump 8, in the embodiment shown in FIG. 1), thus completing the first thermodynamic circuit 4. The first condenser 7 is thermally coupled to the first reservoir 2 but the first working fluid 23 is distinct from the first storage medium contained in the first reservoir 2.

The second thermodynamic circuit 5 comprises a second evaporator 14, a second expander 11 and a second condenser 12. In the non-limiting embodiments shown in the Figures, the second thermodynamic circuit 5 includes a second pump 13 for pumping the second working fluid 24. However, in alternative embodiments, other means for circulating and creating a pressure differential in the second working fluid 24 may be provided. The second evaporator 14 is arranged to evaporate the second working fluid 24 to create a second pressurised vapour. The second evaporator 14 is thermally coupled to the second reservoir 3 but the second working fluid 24 is distinct from the second storage medium contained in the second reservoir 3. The second expander 11 is arranged to receive and expand the second pressurised vapour. In certain embodiments, the second expander 11 may be an expander generator capable of generating electrical energy. In alternative embodiments, the second expander 11 may be arranged to provide mechanical work to other components (e.g. a shaft). In certain embodiments, the second expander 11 may be a radial turbine, axial turbine, impulse turbine (or other type of turbine), scroll expander, screw expander, Tesla turbine, or a reciprocating engine. The second condenser 12 is arranged to condense second working fluid 24 received from the second expander 11 and provide second working fluid 24 to the second evaporator 14 (via the second pump 13, in the embodiment shown in FIG. 1).

The thermodynamic cycle apparatus 100 of FIG. 1 includes an auxiliary heat source 10 that is thermally connected to the first thermodynamic circuit 4 via auxiliary heat input means so that auxiliary heat may be passed from the auxiliary heat source to the first working fluid 23 and contribute to the creation of the first pressurised vapour. The auxiliary heat source 10 provides energy to evaporate the first working fluid 23. In certain embodiments, the auxiliary heat source 10 may be an abundant and freely available heat source that may optionally be an ambient or environmental heat source such as air, air from inside a building or dwelling, the run of a river, canal water sourced, from a ground source, solar ponds, reservoirs and lakes and the like, heat rejected from an existing air conditioning or refrigeration circuit, or very low grade waste heat. Once heat is extracted from the auxiliary heat source 10, the resulting cooling may be used to cool the inside of a building or dwelling. For example, if the auxiliary heat source 10 is air from inside a building or dwelling, the heat may be extracted from the air, and the cooled air may be returned to the inside of the building or dwelling, thus acting as an air conditioning system.

Additionally, the thermodynamic cycle apparatus 100 of FIG. 1 includes an auxiliary heat sink 15 that is thermally connected to the second thermodynamic circuit 5 via auxiliary heat output means so that the second working fluid 24 can lose heat to the auxiliary heat sink 15. The auxiliary heat input means and/or auxiliary heat output means may be heat exchangers or any other suitable means for transferring thermal energy between the first and second working fluids 23,24 and the auxiliary heat source 10 and auxiliary heat sink 15, respectively. The auxiliary heat sink 15 provides a means for heat to be rejected from the second working fluid 24 after exiting the second expander 11, where such heat loss contributes (at least in part) to the condensation of the second working fluid 24. In certain preferable embodiments, the auxiliary heat sink 15 is ideally as low in temperature as possible and has a large capacity to absorb heat. Examples of suitable auxiliary heat sinks 15 include, but are not limited to, an ambient or environmental heat source such as air, air from inside a building or dwelling, the run of a river, a canal water source, a ground source, and reservoirs and lakes and the like. In embodiments where air from inside a building or dwelling is used as the auxiliary heat sink 15, the air is subsequently heated and may be returned to the building or dwelling to provide heating therein. In such embodiments, the apparatus 100 may serve, in part, as a space heater for the building or dwelling.

In certain embodiments, the first thermodynamic circuit 4 is thermally independent of the second thermodynamic circuit 5 to the extent that there are no means provided to exchange heat therebetween.

The thermodynamic cycle apparatus 100 is operable in a charging mode, a storage mode, and a discharge mode. In the charging mode, the heat pump 1 is energised to cool the first storage medium in the first reservoir 2 and heat the second storage medium in the second reservoir 3. That is, energy (e.g. electrical and/or mechanical) is provided to operate the heat pump 1. The energy provided to the heat pump 1 is the energy that is to be stored by the apparatus 100. In the storage mode, cooled first storage medium is stored in the first reservoir 2 and heated second storage medium is stored in the second reservoir 3. The first and/or second reservoirs 2,3 may be thermally insulated to reduce thermal losses therefrom during the storage mode. In the discharge mode, the first pressurised vapour is expanded by the first expander 6 and/or the second pressurised vapour is expanded by the second expander 11. Thus, energy may be inputted into the thermodynamic cycle apparatus 100 in the charging mode, stored in the storage mode, and discharged, when required, in the discharge mode by operating either or both of the first expander 6 and second expander 11. That is, a first discharge mode may permit the discharging of the first reservoir 2 (operating the first thermodynamic circuit 4, and, in particular, the first expander 6), and a second discharge mode may permit the discharging of the second reservoir 3 (operating the second thermodynamic circuit 5, and, in particular, the second expander 11), where the first discharge mode and second discharge mode may be operated together or separately from one another. If the first expander 6 and/or second expander 11 are expander generators, electrical energy may be recovered from the apparatus 100. In alternative embodiments, energy may be recovered in different forms (e.g. mechanical energy).

The thermal coupling between the first condenser 7 and the first reservoir 2 results in the lower temperature of the first thermodynamic circuit 4 being determined by the temperature of the first reservoir 2. Since the first reservoir 2 is cooled by the heat pump 1 in the charging mode, the cold first reservoir 2 assists in the condensing of the first working fluid 23 in the first discharge mode. The auxiliary heat source 10 provides energy for evaporating the first working fluid 23 and, in the embodiment of FIG. 1, determines the upper temperature of the first thermodynamic circuit 4.

The thermal coupling between the second reservoir 3 and the second evaporator 14 permits heat to be transferred from the second reservoir 3 to the second evaporator 14 to assist the evaporation of the second working fluid 24 when operating in the second discharge mode.

In the embodiment shown in FIG. 1, the upper temperature of the second thermodynamic circuit 5 will be determined by the temperature of the second reservoir 3 (which will be increased by the heat pump 1 when operating in the charging mode). The lower temperature of the second thermodynamic circuit 5 is determined by the auxiliary heat sink 15.

The first thermodynamic circuit 4 and/or second thermodynamic circuit 5 may comprise a circuit for permitting the operation of any suitable thermodynamic cycle, including but not limited to a Rankine cycle, Lorenz cycle or a Kalina cycle.

Figure 2:
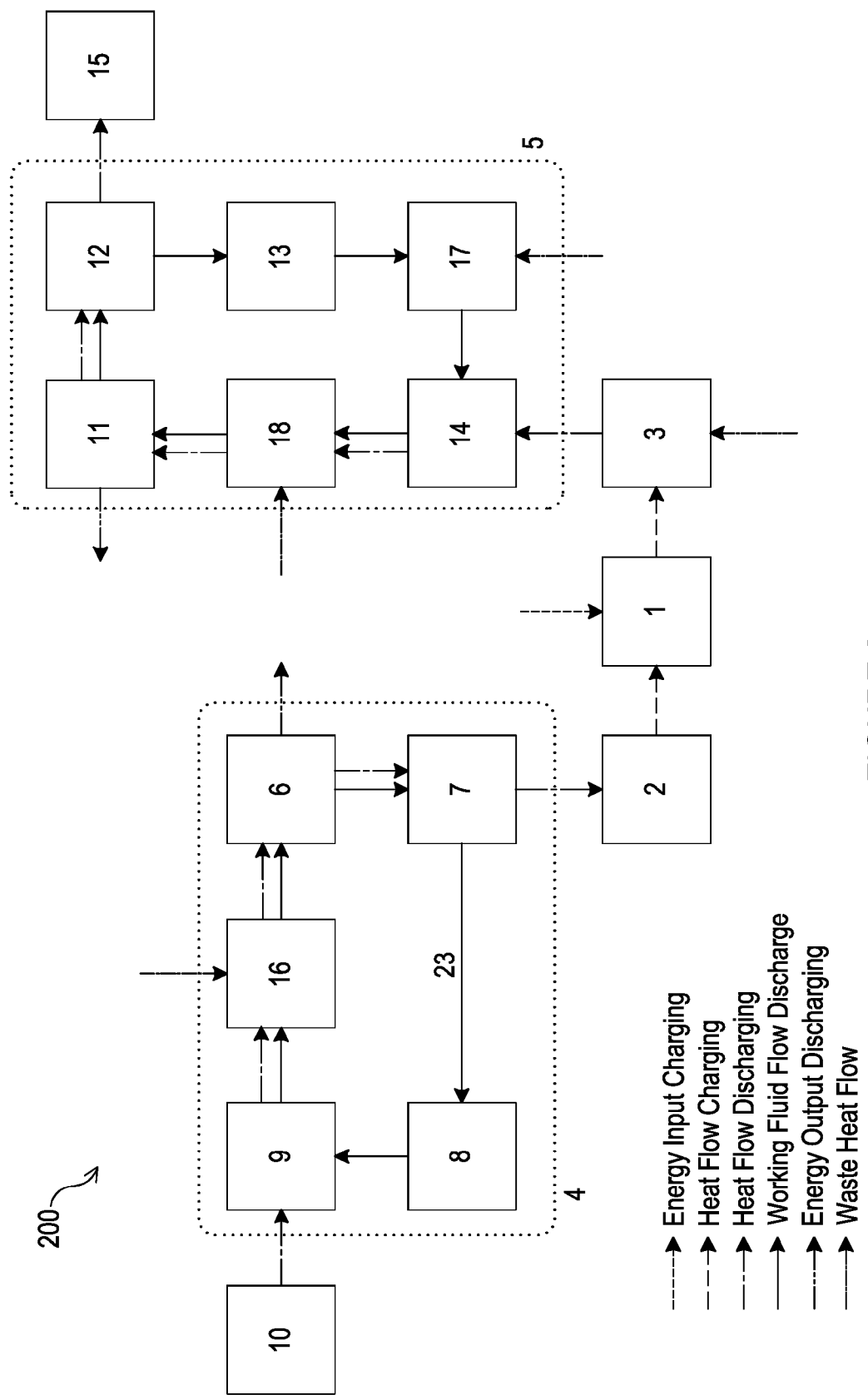
FIG. 2 is a schematic representation of a thermodynamic cycle apparatus according to an alternative embodiment of the present invention.

FIG. 2 shows a variation 200 of the thermodynamic cycle apparatus 100 of FIG. 1 according to an alternative embodiment of the present invention. The apparatus 200 of FIG. 2 is identical to the apparatus 100 of FIG. 1 but additionally includes a first superheater 16, a second preheater 17, and a second superheater 18.

The first superheater 16 is disposed in the first thermodynamic cycle 4 between the first evaporator 9 and the first expander 6. The first superheater 16 is arranged to provide heat to the first working fluid 23 after it leaves the first evaporator 9 and before it is expanded by the first expander 6. The heat provided by the first superheater 16 may be waste heat or from a secondary heat source.

The second preheater 17 is disposed in the second thermodynamic circuit 5 between the second condenser 12 and the second evaporator 14 (and more particularly, between the second pump 13 and the second evaporator 14). The second preheater 17 is arranged to preheat the second working fluid 24 before it enters the second evaporator 14. The second preheater 17 may utilize waste heat or be a secondary heat source.

The second superheater 18 is disposed in the second thermodynamic circuit 5 between the second evaporator 14 and the second expander 11. The second superheater 18 is arranged to heat the second working fluid 24 after it has left the second evaporator 14 and before it is expanded by the second expander 11. The heat provided by the second superheater 18 may be waste heat or from a secondary heat source.

Further embodiments according to the present invention are described below with reference to FIGS. 3 to 9. In all described embodiments, like reference numerals correspond to like components and features.

Figure 3:
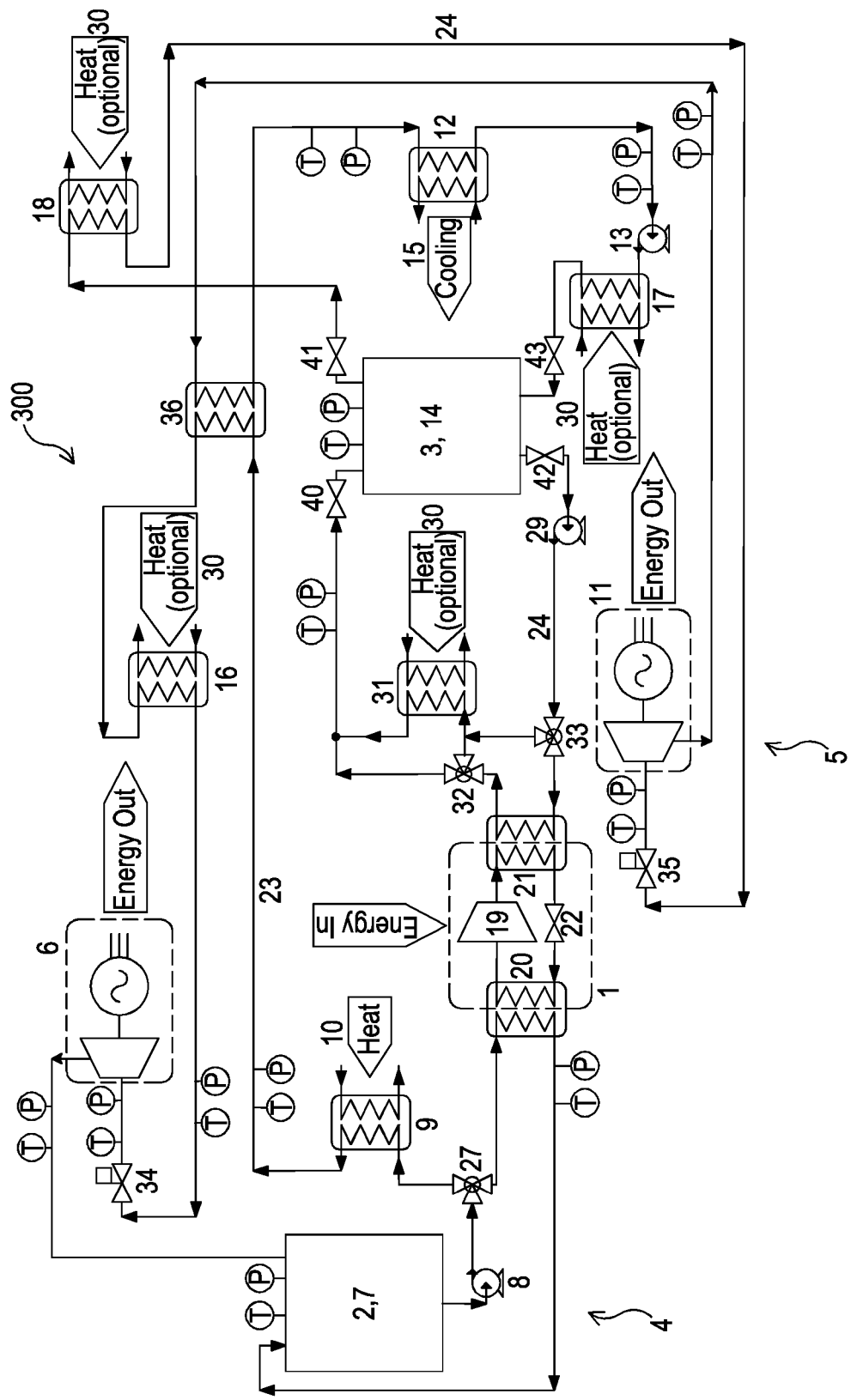
FIG. 3 is a detailed representation of a thermodynamic cycle apparatus according to a further embodiment of the present invention.

FIG. 3 shows a thermodynamic cycle apparatus 300 according to an embodiment of the present invention. In the embodiment of FIG. 3, encapsulated phase change materials (PCM) are utilised as first and second storage media in the first and second reservoirs 2,3, respectively. The PCM are capable of storing or giving up heat at a relatively constant temperature as the PCM changes phase from liquid to solid or vice versa.

The first ("cold side") PCM in the first reservoir 2 is an encapsulated phase change material, such that the first working fluid 23 does not come directly in contact with the PCM and the PCM is not washed out of the first reservoir 2 during operation. The encapsulation is configured in a way that allows for good thermal contact of the first working fluid 23 to the PCM material (e.g. multiple encapsulated spheres, flat plates, stacks of tubes, honeycomb etc.) and does not significantly impede the flow of the first working fluid 23 through the first reservoir 2 during operation. In this embodiment, the first reservoir 2 also serves as the first condenser 7.

Prior to operating in the charging mode, a valve 27 is set to divert the first working fluid 23 to the refrigeration evaporator 20 from the first reservoir 2 when the first pump 8 is operated. The cold side PCM will be fully liquid at this stage if the first reservoir 2 was fully discharged (i.e. by operation of the first discharge mode) during its previous operation and will preferably be at its melting point temperature, though in some configurations it may be slightly above melting point.

The second ("hot side") PCM in the second reservoir 3 is an encapsulated phase change material, such that the second working fluid 24 does not come directly in contact with the PCM and the PCM is not transferred out of the second reservoir 3 during operation. The encapsulation is configured in a way that allows for good thermal contact of the second working fluid 24 to the PCM material (e.g. multiple encapsulated spheres, flat plates, stacks of tubes, honeycomb etc.) and does not significantly impede the flow of the second working fluid 24 through the second reservoir 3 during operation. In this embodiment, the second reservoir 3 also serves as the second evaporator 14.

Prior to operating in the charging mode, optional isolation valves 40 and 42 may be opened (if present), and optional isolation valves 41 and 43 may be closed (if present). Optional three way valves 32 and 33 may be set to either divert the second working fluid 24 solely to the refrigeration condenser 21, or to a suitable position if some additional heat source is also to be utilised via a heat exchanger 31, from the second reservoir 3 (when a pump 29 is operated to circulate second working fluid 24). The hot side PCM will be fully solid at this stage if the second reservoir 3 was fully discharged (i.e. by operation of the second discharge mode) during its previous operation and no additional heat had been added since, via heat exchanger 31. The hot side PCM will preferably be at its melting point temperature, though in some configurations it may be slightly below melting point.

When operating in the charging mode, the heat pump 1 is connected to an electrical or mechanical energy supply and energized so as to drive the refrigeration compressor 19. This pressurises gaseous refrigerant within the heat pump 1 and raises its temperature prior to entering the refrigeration condenser 21. Consequently, heat is supplied to the second working fluid 24 that is being circulated by pump 29 through the other side of the refrigeration condenser 21. By giving up heat to the second working fluid 24, the refrigerant is condensed to a liquid phase. The liquid phase refrigerant then enters the expansion valve 22 which reduces its pressure and, correspondingly, its boiling point. The refrigerant entering the refrigerant evaporator 20 is boiled as it extracts heat from the first working fluid 23 being circulated through the other side of the refrigerant evaporator 20 via the pump 8.

The apparatus 300 operates in the charging mode until, preferably, although not necessarily, all of the cold side PCM is solidified. This will be detectable by the temperature of the first working fluid 23 notably falling as heat extracted from the first working fluid 23 is no longer coming from the latent heat of fusion of the cold side PCM.

It is possible, but not essential, to tune the mass of the hot side PCM in the second reservoir 3 such that when all of the cold side PCM is solidified, all of the hot side PCM is melted concurrently. In certain embodiments (e.g. to allow for optional waste heat storage and recovery from alternative sources), the mass of hot side PCM may be in excess of such a "tuned" value without affecting system performance in any way.

In certain embodiments, the charging mode may cease operation at, or before, the point that all of the cold side PCM becomes solid so that no energy is used to provide "sensible cooling" to the cold side PCM. In this way, a fixed temperature differential, and therefore coefficient of performance, can be maintained across the heat pump 1, thereby enabling the design of the heat pump 1 and the selection of the refrigerant to be optimised around a single operating point.

When the apparatus 300 is operated in the storage mode, the heat pump 1 is not operated, nor is any component in the first thermodynamic circuit 4.

If the apparatus 300 is operating purely as an energy storage system with no recovery of additional heat sources, there will be no operation of any component in the second thermodynamic circuit 5.

If additional heat sources are available, the second reservoir 3 can be continually charged by setting optional three way valves 32 and 33 to positions such that operation of pump 29 diverts the second working fluid 24 through heat exchanger 31 to make use of the continual, or intermittent, heat source during storage mode operation.

Discharge of the cold and hot sides of the system can be done independently or simultaneously depending on local power requirements. That is, a first discharge mode may permit the discharging of the first reservoir 2, and a second discharge mode may permit the discharging of the second reservoir 3. The first and second expanders 6,11 may be at rest prior to operation of the respective discharge modes, or they may be motored such that they are at operating speed before introduction of the first and second working fluids 23,24, respectively. Some applications may require instantaneous power, and this may be accommodated by the use of capacitive storage 53 which can be included in drive/power electronics 52 to provide an instantaneous supply (see FIG. 10). In alternative embodiments, other additional non-thermal energy storage means may be provided which may, for example, be mechanical or electrical. For example, the additional non-thermal energy storage means may be a flywheel or a battery.

Prior to operation of the first discharge mode, the three-way valve 27 is positioned such that operation of pump 8 diverts the first working fluid 23 through first evaporator 9.

Upon operation of the first discharge mode, pump 8 pumps the first working fluid 23 from the first reservoir 2 into the first evaporator 9 where it is heated and evaporated by a heat source. In certain non-limiting embodiments, the heat source thermally connected to first evaporator 9 may be an ambient or environmental heat source. The first working fluid 23 then passes through optional heat exchanger 36 (if present) to receive any residual heat from the second working fluid 24 as it exits the second expander 11 (if the second discharge mode is also being operated). This may heat the gaseous first working fluid 23 further (e.g. superheat it), or it may alternatively raise the temperature at which the first working fluid 23 is evaporated by pushing the liquid/vapour level into the heat exchanger 36 (if thermodynamically favourable), prior to entry into the first expander 6.

Before entry into the first expander 6, the first working fluid 23 may pass through an optional heat exchanger 16 if an additional heat source 30 is available. This may heat the gaseous first working fluid 23 further (e.g. superheat it), or it may alternatively raise the temperature at which the first working fluid 23 is evaporated by pushing the liquid/vapour level into the heat exchanger 16 (if thermodynamically favourable), prior to entry into the first expander 6.

The gaseous first working fluid 23 enters the first expander 6 and, due to the pressure difference across the first expander 6 (which is set by the condensing pressure in the first reservoir 2 and the heat source used to evaporate the first working fluid 23), the first working fluid 23 drives the first expander 6 as it expands, thus converting the energy extracted from the heat source in first evaporator 9 (and optionally heat exchangers 36 and 16) to electrical or mechanical energy.

The first working fluid 23 exits the first expander 6 in a gaseous state and returns to the first reservoir 2 where it comes into contact with the encapsulated cold side PCM and condenses as the PCM absorbs the latent heat required to do so. This process gradually melts the cold side PCM as the first reservoir 2 is discharged.

The first discharge mode can be operated to partially or fully melt the cold side PCM and still allow the next charging mode operation to commence with the cold side PCM still at its freezing point temperature. Alternatively, it may be preferable to continue operating the first discharge mode until after all of the cold side PCM is melted, if sufficient power can still be generated. This then means that the heat pump 1 will operate over a temperature range during the next operation of the charging mode. Either way, an indication that cold side PCM has fully melted may be obtained by measuring a rise in temperature of the first working fluid 23 in, or exiting, the first reservoir 2.

Prior to operating the second discharge mode, optional isolation valves 41 and 43 may be opened (if present). Optional isolation valves 40 and 42 may be closed (if present) if no additional heat input is available via heat exchanger 31 during the operation of the second discharge mode. If additional heat sources are available, the second reservoir 3 can be continually charged by controlling optional three way valves 32 and 33. In particular, optional three way valves 32 and 33 may be set to positions such that operation of pump 29 diverts the second working fluid 24 through heat exchanger 31 (optional isolation valves 40 and 42 may be left open). This makes use of a continual (optional) heat source during operation of the second discharge mode and therefore permits simultaneous charging and discharging of the second reservoir 3 without operation of the heat pump 1.

Upon operation of the second discharge mode, the opening of valve 41 creates a pressure drop in the second reservoir 3, where the second working fluid 24 had been stored at saturation at a pressure set by the melting point temperature (or a temperature close to this point) of the hot side PCM. Dropping the pressure in this way encourages the second working fluid 24 to boil and thus extract heat from the hot side PCM to overcome the latent heat of vaporisation of the second working fluid 24 required to do so.

Between exiting the second reservoir 3 and entering the second expander 11, gaseous second working fluid 24 may pass through an optional heat exchanger 18, if an additional heat source is available. This may heat the gaseous second working fluid 24 further (e.g. adding superheat), or it may alternatively be used to raise the temperature at which the second working fluid 24 is evaporated by pushing the liquid/vapour level into this heat exchanger 18 (if thermodynamically favourable), prior to entry into the second expander 11.

The gaseous second working fluid 24 enters the second expander 11 and, due to the pressure difference across the second expander 11 (set by the condensing pressure of the second working fluid 24 in second condenser 12 and the heat source used to evaporate the second working fluid 24), the second working fluid 24 drives the second expander 11 as it expands, and converts the energy extracted from the second reservoir 3 (and optionally heat exchanger 18) to electrical or mechanical energy.

Upon exiting the second expander 11, the second working fluid 24 is still gaseous and may enter optional heat exchanger 36 where it can exchange any residual heat that would be thermodynamically advantageous to the first working fluid 23 (if the first discharge mode is also being operated). Optional heat exchanger 36 is not present in embodiments in which the first thermodynamic circuit 4 is thermally independent of the second thermodynamic circuit 5.

The second working fluid 24 then enters second condenser 12 (acting as auxiliary heat output means) where it is condensed by the auxiliary heat sink 15.

Alternatively, if it were thermodynamically advantageous, the apparatus 300 could be configured such that the second working fluid 24 is condensed in the optional heat exchanger 36 and then subcooled in second condenser 12.

The condensed hot side working fluid 24 is then drawn into the suction side of the pump 13 and pumped back into the hot side thermal store 3 via optional heat exchanger 17 where an alternative/waste heat source 30 can preheat the working fluid 24 if available. This process continues gradually solidifying the hot side PCM as the hot side working fluid 24 absorbs heat from it as it evaporates.

Operation of the second discharge mode can be progressed to partially or fully solidify the hot side PCM and still allow the next operation of the charging mode to commence with the hot side PCM still at its melting point temperature, or in some circumstances it may be preferable to operate the second discharge mode until after the point at which all of the hot side PCM is solidified if sensible power can still be generated. The latter option means the heat pump 1 will operate over a temperature range during the next operation of the charging mode. In any case, an indication that the hot side PCM has fully solidified may be provided by a measureable fall in temperature of the second working fluid 24 in, or exiting, the second reservoir 3.

Figure 4:
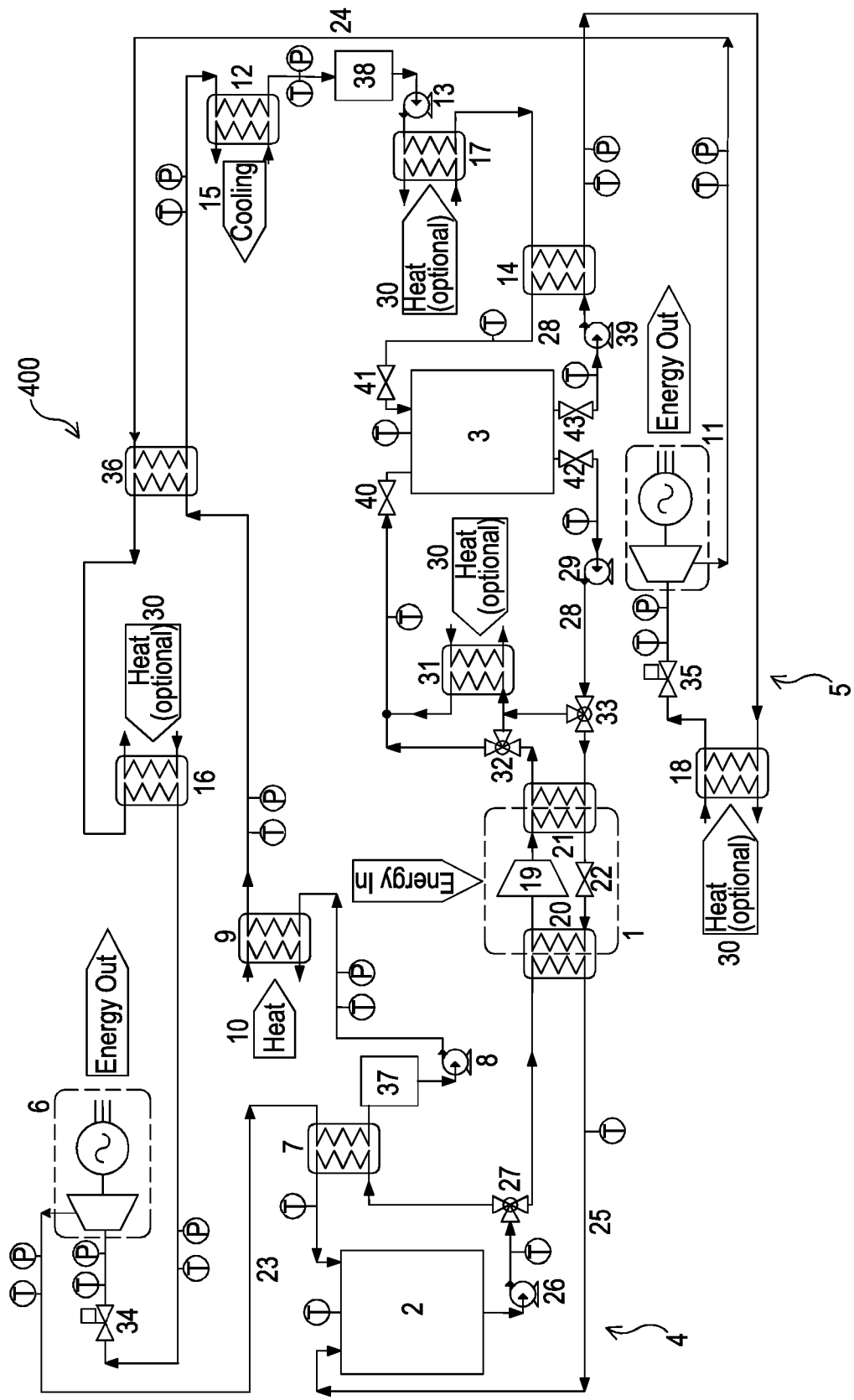
FIG. 4 is a detailed representation of a thermodynamic cycle apparatus according to a further embodiment of the present invention.

FIG. 4 shows a thermodynamic cycle apparatus 400 according to an embodiment of the present invention.

A first heat transfer fluid 25 is utilised to thermally couple and exchange heat between the heat pump 1 and the first reservoir 2, and the first reservoir 2 and the first condenser 7. Additionally, a second heat transfer fluid 28 is utilised to thermally couple and exchange heat between the heat pump 1 and the second reservoir 3, and the second reservoir 3 and the second evaporator 14. The first and second heat transfer fluids 25, 28 form heat transfer circuits. In alternative embodiments, one or more separate heat transfer circuits (each having a separate heat transfer fluid, for example) may be utilised to thermally couple any of the heat pump 1 and the first reservoir 2, the first reservoir 2 and the first condenser 7, the heat pump 1 and the second reservoir 3, and the second reservoir 3 and the second evaporator 14.

The cold side PCM in the first reservoir 2 is an encapsulated phase change material, such that the first heat transfer fluid 25 does not come directly in contact with the PCM and the PCM is not washed out of the first reservoir 2 during operation.

The encapsulation is configured in a way that allows for good thermal contact of the first heat transfer fluid 25 to the PCM material (e.g. multiple encapsulated spheres, flat plates, stacks of tubes, honeycomb etc.) and does not significantly impede the flow of the first heat transfer fluid 25 through the first reservoir 2 during operation.

Prior to operating in the charging mode, valve 27 is set to divert the first transfer fluid 25 to the heat pump evaporator 20 from the first reservoir 2 when pump 26 is operated. The cold side PCM will be fully liquid at this stage (if first reservoir 2 was fully discharged during the previous operation of the discharge mode, i.e. during operation of the first discharge mode) and will preferably be at its melting point temperature, though in some configurations it may be slightly above melting point.

The hot side PCM in the second reservoir 3 is an encapsulated PCM, such that the second heat transfer fluid 28 does not come directly in contact with the PCM and the PCM is not washed out of the second reservoir 3 during operation.

The encapsulation is configured in a way that allows for good thermal contact of the second heat transfer fluid 28 to the PCM material (e.g. multiple encapsulated spheres, flat plates, stacks of tubes etc.) and does not significantly impede the flow of the second heat transfer fluid 28 through the second reservoir 3 during operation.

Prior to operation in the charging mode, optional isolation valves 40 and 42 may be opened (if present), and optional isolation valves 41 and 43 may be closed (if present). Optional three way valves 32 and 33 are set to either divert the second heat transfer fluid 28 solely to the refrigeration condenser 21, or to a suitable position if some additional heat source is also to be utilised via heat exchanger 31, from the second reservoir 3 when a pump 29 is operated. The hot side PCM will be fully solid at this stage (if the second reservoir 3 was fully discharged during previous operation of the discharge mode, i.e. during operation of the second discharge mode) and no additional heat had been added since via heat exchanger 31. The hot side PCM will preferably be at its melting point temperature, though in some configurations it may be slightly below melting point.

When operating in the charging mode, the heat pump 1 is energised (e.g. connected to an electrical or mechanical energy supply) to drive the refrigeration compressor 19. This heats and pressurises gaseous refrigerant within the heat pump 1 prior to entering the refrigeration condenser 21. Consequently, heat is supplied to the second heat transfer fluid 28 that is being circulated via pump 29 through the other side of the refrigeration condenser 21. Giving up heat to the second heat transfer fluid 28 condenses the heat pump refrigerant to a liquid phase which then enters the expansion valve 22, and this reduces its pressure and, correspondingly, its boiling point. The refrigerant entering the refrigeration evaporator 20 is boiled as it extracts heat from the first heat transfer fluid 25 being circulated through the other side of the refrigeration evaporator 20 via the pump 26.

Operation of the charging mode may preferably (although no necessarily) continue until a time when all the cold side PCM is solidified. This will be detectable by the temperature of the first heat transfer fluid 25 notably falling as heat extracted from the first reservoir 2 is no longer coming from the latent heat of fusion of the cold side PCM.

In certain preferable embodiments, the mass of the hot side PCM in the second reservoir 3 may be tuned such that the instance at which all of the cold side PCM is solidified is reached coincides with the instance at which all of the hot side PCM is melted. In practical terms, and to allow for optional waste heat recovery from alternative sources, the mass of hot side PCM may be in excess of this tuned value without affecting system performance in any way.

In certain embodiments, operation of the charging mode ceases at, or before, the point that all of the cold side PCM becomes solid so that no energy is used to provide "sensible cooling" to the cold side PCM. In this way, a fixed temperature differential, and therefore coefficient of performance, can be maintained across the heat pump 1 enabling the heat pump design and refrigerant selection to be optimised around a single operating point.

In certain embodiments, during operation of the storage mode, the heat pump 1 may not be operated, nor may any component in the first thermodynamic circuit 4.

If the apparatus 400 is operating purely as an energy storage system with no recovery of additional heat sources, no component in the second thermodynamic circuit 5 needs to be operated either.

If additional heat sources are available, the second reservoir 3 can be continually charged by setting optional three way valves 32 and 33 to positions such that operation of pump 29 diverts the second heat transfer fluid 28 through heat exchanger 31 to make use of the continual, or intermittent, heat source during operation of the charging mode.

As with the embodiment described above in relation to FIG. 3, discharge of the first and second thermodynamic circuits 4,5 can be done independently or simultaneously depending on local power requirements. That is, a first discharge mode may permit the discharging of the first thermodynamic circuit 4, and a second discharge mode may permit the discharging of the second thermodynamic circuit 5. The first and second expanders 6,11 may be at rest prior to operation of the discharge modes, or they may be motored such that they are at operating speed before introduction of the first and second working fluids 23,24. In embodiments where instantaneous power may be required, capacitive storage 53 can be included in the drive/power electronics 52 to provide an instantaneous supply (see FIG. 10). In alternative embodiments, other additional non-thermal energy storage means may be provided which may, for example, be mechanical or electrical. For example, the additional non-thermal energy storage means may be a flywheel or a battery.

Prior to operation of the first discharge mode the three-way valve 27 is positioned such that operation of pump 26 diverts the first heat transfer fluid 25 through first condenser 7.

Upon operation of the first discharge mode, pump 8 pumps the first working fluid 23 into first evaporator 9 where it is heated and evaporated by a heat source. In certain non-limiting embodiments, the heat source may be an ambient heat source. The first working fluid 23 then passes through optional heat exchanger 36 to pick up any residual heat from the second working fluid 24 as it exits the second expander 11 (if the second discharge mode is being operated). This heats the gaseous first working fluid 23 further (e.g. superheats it), or alternatively could be used to raise the temperature at which the first working fluid 23 is evaporated by pushing the liquid/vapour level into this heat exchanger 36 (if thermodynamically favourable), prior to entry into the first expander 6.

Before entry into the first expander 6 the first working fluid 23 may pass through optional heat exchanger 16 if an additional heat source 30 is available. This heats the gaseous first working fluid 23 further (e.g. superheats it), or alternatively could be used to raise the temperature at which the first working fluid 23 is evaporated by pushing the liquid/vapour level into this heat exchanger 16 (if thermodynamically favourable), prior to entry into the first expander 6.

The gaseous first working fluid 23 enters the first expander generator 6 and, due to the pressure difference across the expander set by the condensing pressure in first condenser 7 and the heat source use to evaporate the first working fluid 23, the first working fluid 23 drives the expander generator 6 as it expands converting the energy extracted from the heat source in first evaporator 9 (and optionally heat exchangers 36 and 16) to electrical or mechanical energy.

The first working fluid 23 exits the first expander 6 while still in a gaseous state and enters first condenser 7. Pump 26 pumps the first heat transfer fluid 25 from the first reservoir 2 into the first condenser 7. This puts the first working fluid 23 in thermal contact with the first reservoir 2 which condenses the first working fluid 23 as the first heat transfer fluid 25 absorbs heat from it. The condensed first working fluid 23 then may optionally first enter the buffer storage 37 (if present) and then enter pump 8, or be drawn directly into pump 8 once more for the cycle to continue. The first heat transfer fluid 25 leaving first condenser 7 is returned to the first reservoir 2 where it exchanges heat with the cold side PCM, causing its gradual melting as the first discharge mode is operated.

The operation of the first discharge mode can be progressed to partially or fully melt the cold side PCM and still allow the next operation of the charging mode to commence with the cold side PCM still at its freezing point temperature. Alternatively, in some embodiments it may be preferable to operate the first discharge mode until after the instance when all of the cold side PCM is melted if sensible power can still be generated, this then means the heat pump 1 will operate over a temperature range during the next operation of the charging mode. In any case, an indication that the cold side PCM has fully melted may be provided by a measureable rise in temperature of the first heat transfer fluid 25 in, or exiting, the first reservoir 2.

Prior to operating the second discharge mode, optional isolation valves 41 and 43 may be opened (if present). Optional isolation valves 40 and 42 may be closed (if present) if no additional heat input is available via heat exchanger 31 during the operation of the second discharge mode. If additional heat sources are available, the second reservoir 3 can be continually charged by setting optional three way valves 32 and 33 to positions such that operation of pump 29 diverts the second heat transfer fluid 28 through heat exchanger 31 to make use of the continual heat source during the operation of the second discharge mode and by leaving optional isolation valves 40 and 42 open. This allows for simultaneous charging of the second reservoir 3 and operation of the second discharge mode without operation of the heat pump 1.

Upon operation of the second discharge mode, the pump 39 is operated to circulate the second heat transfer fluid 28 from the second reservoir 3 to second evaporator 14. On exiting the second evaporator 14 the second heat transfer fluid 28 is returned to the second reservoir 3 to allow for continual circulation. Pump 13 is operated to pump the second working fluid 24 into the other side of second evaporator 14 where it is evaporated using the heat from the second heat transfer fluid 28.

The second working fluid 24 exits the second evaporator 14 and, before entry into the second expander 11, it may pass through optional heat exchanger 18 if an additional/waste heat source 30 is available. This heats the gaseous second working fluid 24 further (e.g. adding superheat), or alternatively could be used to raise the temperature at which the second working fluid 24 is evaporated by pushing the liquid/vapour level into this heat exchanger 18 (if thermodynamically favourable), prior to entry into the second expander 11.

The gaseous second working fluid 24 enters the second expander 11 and, due to the pressure difference across the second expander 11 (set by the condensing pressure of the second working fluid 24 in second condenser 12 and the heat source used to evaporate the second working fluid 24), the second working fluid 24 drives the expander 11 (as it expands) converting the energy extracted from the second heat transfer fluid 28 (and optionally heat exchanger 18) to electrical or mechanical energy.

Upon exiting the second expander 11 the second working fluid 24 is still gaseous and may then enter optional heat exchanger 36 where it can exchange any residual heat that would be thermodynamically advantageous to the first working fluid 23 if the first discharge mode is also being operated.

The second working fluid 24 then enters the second condenser 12 where it is condensed by the auxiliary heat sink 15 on the other side of the second condenser 12. In certain non-limiting embodiments, the auxiliary heat sink 15 may be an ambient heat sink.

Alternatively, if it were thermodynamically advantageous, the apparatus 400 could be configured such that the second working fluid 24 is condensed in the optional heat exchanger 36 and then subcooled in second condenser 12.

The condensed second working fluid 24 then may optionally first enter the buffer storage 38 (if present) and then enter pump 13, or be drawn directly into pump 13 for the cycle to continue and be pumped back into the second evaporator 14 (via optional heat exchanger 17) where an alternative/waste heat source 30 can preheat the second working fluid 24, if available.

This process may continue and cause the gradual solidification of the hot side PCM as the second working fluid 24 absorbs heat from it (via the second heat transfer fluid 28) as it evaporates.

The operation of the second discharge mode can be progressed to partially or fully solidify the hot side PCM and still allow the next operation of the charging mode to commence with the hot side PCM still at its melting point temperature. Alternatively, in some circumstances it may be preferable to operate the second discharge mode until after the instance when all of the hot side PCM is solidified, if sensible power can still be generated. This then means the heat pump 1 will operate over a temperature range during the next operation of the charging mode. In any case, an indication that the hot side PCM has fully solidified may be provided by a measureable fall in temperature of the second heat transfer fluid 28 in, or exiting, the second reservoir 3.

Figure 5:
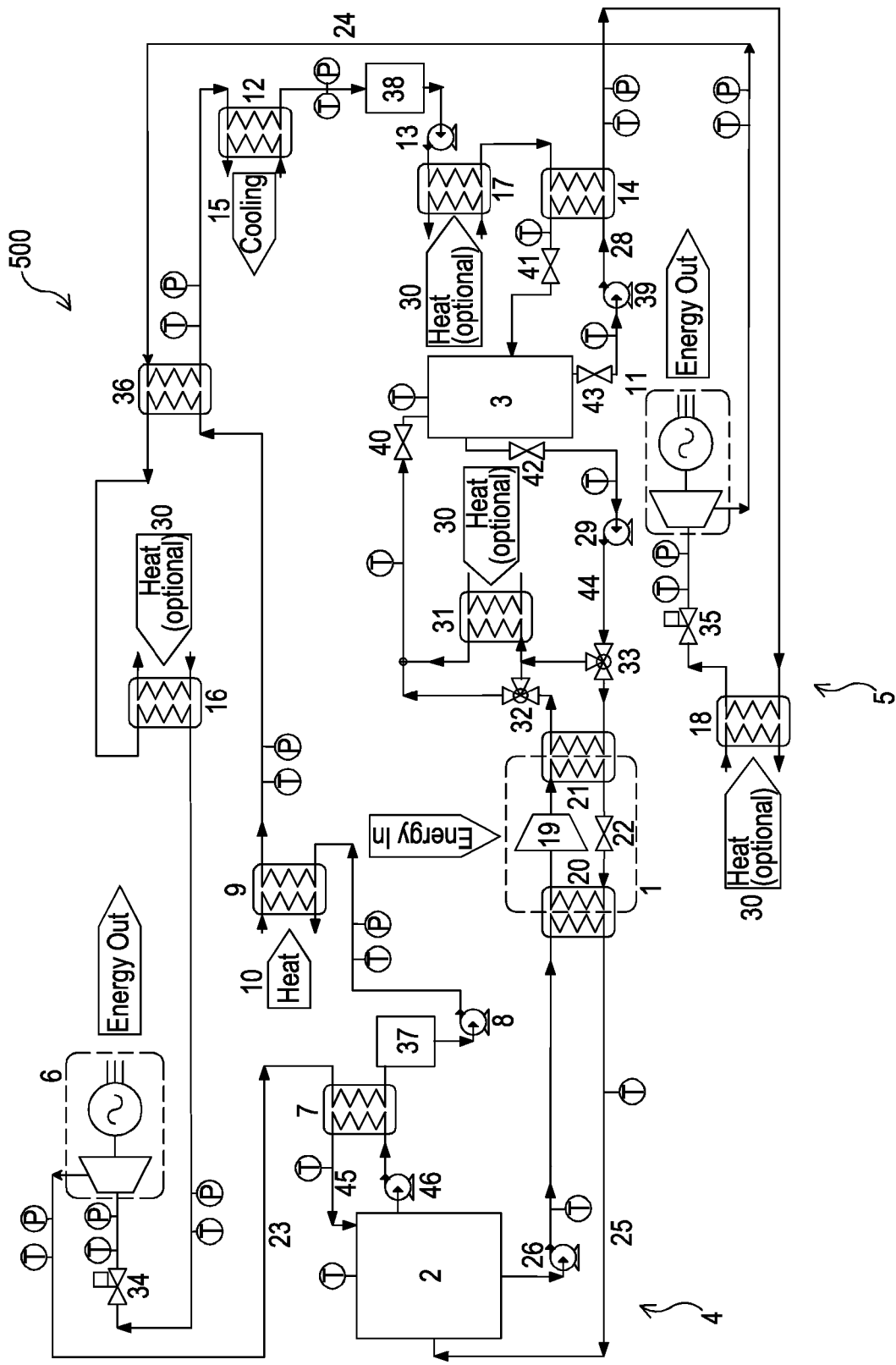
FIG. 5 is a detailed representation of a thermodynamic cycle apparatus according to a further embodiment of the present invention.

FIG. 5 shows a thermodynamic cycle apparatus 500 according to an embodiment of the present invention.

In the embodiment of FIG. 5, unencapsulated PCMs are utilised in the first and second reservoirs 2,3 in order to store or give up heat at a relatively constant temperature as the PCM changes phase from liquid to solid or vice versa.

The cold side PCM in the first reservoir 2 is not encapsulated in any way. The first heat transfer fluid 25 is in direct contact with the cold side PCM. The two substances are chosen so that they are not miscible and have different specific gravities such that they do not mix readily and separate under gravity when the PCM is both in liquid and solid phases. Due to this natural separation, it is possible to locate a suction port such that, during operation of the charging mode, only the first heat transfer fluid 25 is drawn off from the first reservoir 2 whilst simultaneously allowing optimal thermal contact with the cold side PCM.

This natural separation also allows for the location of a suction port such that, during operation of the first discharge mode, only a solid/liquid slurry mixture 45 of the cold side PCM is drawn off from the first reservoir 2. It is appreciated that there may be traces of the first heat transfer fluid 25 entrained within the slurry 45, but these traces will be minimal.

Prior to operation of the charging mode, the cold side PCM will be fully liquid (if the first reservoir 2 was fully discharged during previous operation of the first discharge mode) and will preferably be at its melting point temperature, though in some embodiments it may be slightly above melting point.

The hot side PCM in the second reservoir 3 is not encapsulated in any way. The second heat transfer fluid 28 is in direct contact with the hot side PCM. The two substances are chosen so that they are not miscible and have different specific gravities such that they do not mix readily and separate under gravity when the PCM is both in liquid and solid phases. Due to this natural separation, it is possible to locate a suction port such that, during operation of the second discharge mode, only the second heat transfer fluid 28 is drawn off from the second reservoir 3 whilst simultaneously allowing optimal thermal contact with the hot side PCM.

This natural separation also allows for the location of a suction port such that, during operation of the charging mode, only a solid/liquid slurry mixture 44 of the hot side PCM is drawn off from the second reservoir 3. It is appreciated that there may be traces of the second heat transfer fluid 28 entrained within the slurry, but these traces will be minimal.

Prior to operation of the charging mode, optional isolation valves 40 and 42 may be opened (if present), and optional isolation valves 41 and 43 may be closed (if present). Optional three way valves 32 and 33 are set to either divert the hot side PCM slurry 44 solely to the refrigeration condenser 21, or to a suitable position if some additional heat source is also to be utilised (via heat exchanger 31), from the second reservoir 3 when pump 29 is operated. The hot side PCM will be in a solid/liquid slurry at this stage, where the exact solid to liquid content will be dependent on how long the preceding second discharge mode was operated for, and if any additional heat had been added since via heat exchanger 31. The hot side PCM will preferably be at its melting point temperature.

During operation of the charging mode, the heat pump 1 is energized to drive the refrigeration compressor 19. This heats and pressurises gaseous refrigerant within the heat pump 1 prior to it entering the refrigeration condenser 21. Heat is therefore supplied to the hot side PCM slurry 44 that is being circulated via pump 29 through the other side of the refrigeration condenser 21. Giving up heat to the hot PCM slurry 44 condenses the heat pump refrigerant to a liquid phase which then enters the refrigeration expansion valve 22 which reduces its pressure and, correspondingly, its boiling point. The refrigerant entering the refrigeration evaporator 20 is boiled as it extracts heat from the first heat transfer fluid 25 being circulated through the other side of the refrigeration evaporator 20 via the pump 26.

During this phase, the first heat transfer fluid 25 is returned to the first reservoir 2 after leaving the refrigeration evaporator 20 at a point where it will immediately come in to contact with liquid phase cold side PCM. If the liquid phase cold side PCM is already at its melting point temperature, small solid particles of it will form on contact with the first heat transfer fluid 25 re-entering the first reservoir 2. Due to the immiscibility of the substances, and their different specific gravities, they will separate allowing the first heat transfer fluid 25 to be continually pumped out of the first reservoir 2 and through the refrigeration evaporator 20 during operation of the charging mode. The solidified particles of cold side PCM will rise or sink in the liquid phase cold side PCM depending on the properties of the substance. This causes an accumulation of cold side PCM slurry to concentrate within the first reservoir 2. Operation of the charging mode may preferably continue until the instance where all the cold side PCM slurry has reached the maximum desired solids density within the first reservoir 2.

During operation of the charging mode, the hot PCM slurry 44 that passes through the refrigeration condenser 21, and/or optional heat exchanger 31, will be continually melted as the heat pump 1 transfers heat into it.

It is possible, but not essential, to tune the mass of the second PCM in the second reservoir 3 such that when the instance that the maximum cold side PCM slurry solids density occurs, it coincides with the instance that all of the hot side PCM is melted. In practical terms, and to allow for optional waste heat recovery from alternative sources, the mass of hot side PCM may be in excess of this value without affecting system performance in anyway.

Operation of the charging mode may cease at, or before, the instance that the cold side PCM slurry reaches maximum permissible solids density so that no energy is used to provide "sensible cooling" to the cold side PCM. In this way, a fixed temperature differential, and therefore coefficient of performance, can be maintained across the heat pump 1 enabling the heat pump design and refrigerant selection to be optimised around a single operating point.

In certain embodiments, during operation of the storage mode, the heat pump 1 is not operated, and nor is any component in the first thermodynamic circuit 4.

If the apparatus 500 is operating purely as an energy storage system with no recovery of additional heat sources, the apparatus 500 may be at rest with no components active in the second thermodynamic circuit 5.

If additional heat sources 30 are available, the second reservoir 3 can be continually charged by setting optional three way valves 32 and 33 to positions such that operation of pump 29 diverts the hot side PCM slurry 44 through heat exchanger 31 to make use of the continual, or intermittent, heat source during the storage phase.

As with the embodiments described above in relation to FIGS. 3 and 4, discharge of the first and second reservoirs 2,3 can be done independently or simultaneously depending on local power requirements. That is, a first discharge mode may permit the discharging of the first reservoir 2, and a second discharge mode may permit the discharging of the second reservoir 3. The first and second expanders 6,11 may be at rest prior to discharge, or they may be motored such that they are at operating speed before introduction of the first and second working fluids 23,24. In embodiments where instantaneous power may be required, capacitive storage 53 can be included in the drive/power electronics 52 to provide an instantaneous supply (see FIG. 10). In alternative embodiments, other additional non-thermal energy storage means may be provided which may, for example, be mechanical or electrical. For example, the additional non-thermal energy storage means may be a flywheel or a battery.

Upon operation of the first discharge mode, pump 8 pumps the first working fluid 23 into first evaporator 9 where it is heated and evaporated by the auxiliary heat source 10. In certain non-limiting embodiments, the auxiliary heat source may be an ambient heat source. The first working fluid 23 then passes through optional heat exchanger 36 to pick up any residual heat from the second working fluid 24 as it exits the second expander 11 (if the second discharge mode is also being operated). This heats the gaseous first working fluid 23 further (e.g. superheats it), or alternatively could be used to raise the temperature at which the first working fluid 23 is evaporated by pushing the liquid/vapour level into this heat exchanger 36 (if thermodynamically favourable), prior to entry into the first expander 6.

Before entry into the first expander 6, the first working fluid 23 may pass through optional heat exchanger 16, if an additional heat source 30 is available. This heats the gaseous first working fluid 23 further (e.g. superheats it), or alternatively could be used to raise the temperature at which the first working fluid 23 is evaporated by pushing the liquid/vapour level into this heat exchanger 16 (if thermodynamically favourable), prior to entry into the first expander 6.

The gaseous first working fluid 23 enters the first expander 6 and, due to the pressure difference across the first expander 6 (set by the condensing pressure in first condenser 7 and the heat source use to evaporate the first working fluid 23), the first working fluid 23 drives the expander 6 (as it expands), converting the energy extracted from the auxiliary heat source in the first evaporator 9 (and optionally heat exchangers 36 and 16) to electrical or mechanical energy.

The first working fluid 23 exits the first expander 6 whilst still in a gaseous state and enters the first condenser 7. Pump 46 pumps the cold side PCM slurry 45 from the first reservoir 2 into the first condenser 7. This puts the first working fluid 23 in thermal contact with the cold side PCM slurry 45 which condenses the first working fluid 23 as the cold PCM slurry 45 absorbs heat from it and melts. The condensed first working fluid 23 then may optionally first enter the buffer storage 37 (if present) and then enter pump 8, or be directly drawn into pump 8 once more for the cycle to continue. The cold side PCM leaving the first condenser 7 is returned to the first reservoir 2 as fully liquid or with a greater liquid proportion. This process gradually melts the cold side PCM slurry 45 as the first discharge mode is operated.

Operation of the first discharge mode can be progressed to partially or fully melt the cold side PCM slurry 45 and still allow the next operation of the charging mode to commence with the cold side PCM still at its freezing point temperature. Alternatively, in some embodiments it may be preferable to operate the first discharge mode beyond the point at which all of the cold side PCM slurry 45 is melted, if sensible power can still be generated. This then means the heat pump 1 will operate over a temperature range during the next operation of the charging mode. In any case, an indication that the cold side PCM has fully melted may be detectable by a rise in temperature of the cold side PCM in, or exiting, the first reservoir 2.

Prior to operating the second discharge mode, optional isolation valves 41 and 43 may be opened (if present). Optional isolation valves 40 and 42 may be closed (if present) if no additional heat input is available via heat exchanger 31 during the discharge phase. If additional heat sources are available, the second reservoir 3 can be continually charged by setting optional three way valves 32 and 33 to positions such that operation of pump 29 diverts the hot side PCM slurry 44 through heat exchanger 31 to make use of the continual heat source during operation of the second discharge mode and by leaving optional isolation valves 40 and 42 open. This allows for simultaneous charging of the second reservoir 3 and operation of the second discharge mode without operation of the heat pump 1.

Upon operation of the second discharge mode, pump 39 is operated to circulate the second heat transfer fluid 28 from the second reservoir 3 to the second evaporator 14. On exiting the second evaporator 14, the second heat transfer fluid 28 is returned to the second reservoir 3 at a point where it immediately comes into contact with liquid phase hot side PCM to allow for continual circulation and cooling of the hot side PCM. Pump 13 is operated to pump the second working fluid 24 into the other side of second evaporator 14 where it is evaporated using the heat from the second heat transfer fluid 28.

The second working fluid 24 exits the second evaporator 14, and before entry into the second expander 11, it may pass through optional heat exchanger 18 if an additional heat source 30 is available. This heats the gaseous second working fluid 24 further (e.g. adding superheat), or alternatively could be used to raise the temperature at which the second working fluid 24 is evaporated by pushing the liquid/vapour level into this heat exchanger 18 (if thermodynamically favourable), prior to entry into the second expander 11.

The gaseous second working fluid 24 enters the second expander 11 and, due to the pressure difference across the expander (set by the condensing pressure of the second working fluid 24 in the second condenser 12 and the heat used to evaporate the second working fluid 24), the second working fluid 24 drives the expander 11 (as it expands), converting the energy extracted from the second heat transfer fluid 28 (and optionally heat exchanger 18) to electrical or mechanical energy.

Upon exiting the second expander 11 the second working fluid 24 is still gaseous and may then enter optional heat exchanger 36 where it can exchange any residual heat that would be advantageous to the first working fluid 23 if the first discharge mode is being operated at the same time.

The second working fluid 24 then enters the second condenser 12 where it is condensed by the auxiliary heat sink 15 on the other side of the second condenser. In certain non-limiting embodiments, the auxiliary heat sink 15 may be an ambient heat sink.

Alternatively, if it were thermodynamically advantageous, the apparatus 500 could be configured such that the second working fluid 24 is condensed in the optional heat exchanger 36 and then subcooled in second condenser 12.

The condensed second working fluid 24 then may optionally first enter the buffer storage 38 (if present) then enter pump 13, or be drawn directly into pump 13 for the cycle to continue and be pumped back into the second evaporator 14 (via optional heat exchanger 17) where an alternative/waste heat source 30 can preheat the second working fluid 24, if available.

As the second heat transfer fluid 28 leaves the second evaporator 14 and re-enters the second reservoir 3, it has a cooling effect in the second reservoir 3. Once the hot side PCM material has reached its freezing point temperature any further cooling via the second heat transfer fluid 28 will cause small particles of solidified hot side PCM to form on contact with the second heat transfer fluid 28 re-entering the second reservoir 3.

Due to the immiscibility of the substances, and their different specific gravities, they will separate allowing the second heat transfer fluid 28 to be continually pumped out of the second reservoir 3 and through the second evaporator 14 during the operation of the second discharge mode. The solidified particles of hot side PCM will rise or sink in the liquid phase hot side PCM depending on the properties of the substance. This causes an accumulation of hot side PCM slurry to concentrate within the second reservoir 3. Operation of the second discharge mode may continue until preferably, but not essentially, the instance where the hot side PCM slurry has reached the maximum desired solids density within the second reservoir 3.

Operation of the second discharge mode can be progressed to partially or fully solidify the hot side PCM slurry to maximum desired solid density and still allow the next operation of the charging mode to commence with the hot side PCM still at its melting point temperature within the second reservoir 3.

Figure 6:
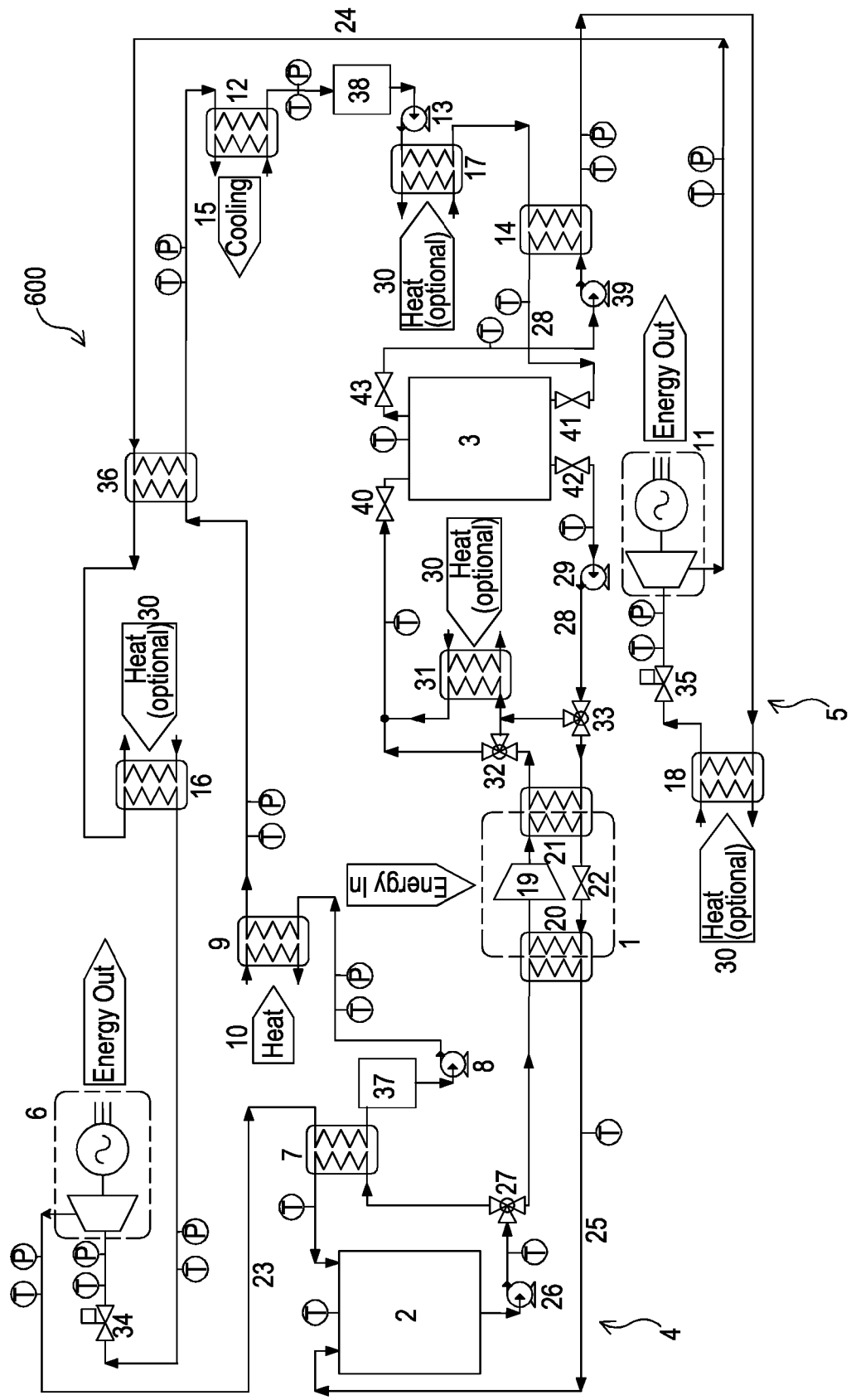
FIG. 6 is a detailed representation of a thermodynamic cycle apparatus according to a further embodiment of the present invention.

FIG. 6 shows a thermodynamic cycle apparatus 600 according to an embodiment of the present invention.

In the embodiment of FIG. 6, the first and second storage media in the first and second reservoirs 2, 3, respectively, comprise liquid media that do not change phase during normal operating temperatures. That is the first storage medium is a first (or "cold side") storage liquid and the second storage medium is a second (or "hot side") storage liquid.

The first storage liquid in the first reservoir 2 is a liquid that preferably has a high specific heat capacity and will preferably not undergo a phase change as it is cooled. In this embodiment, the first storage liquid and the first heat transfer fluid 25 are one and the same media.

Prior to operation of the charging mode, valve 27 is set to divert the first heat transfer fluid 25 to the refrigeration evaporator 20 from the first reservoir 2 when pump 26 is operated. The cold side storage liquid will be fully at its highest storage temperature if the first reservoir 2 was fully discharged during the previous operation of the first discharge mode (i.e. during operation of the first discharge mode).

The second storage liquid in the second reservoir 3 is a liquid that preferably has a high specific heat capacity and will preferably not undergo a phase change as it is heated. In this embodiment the second storage liquid and the second heat transfer fluid 28 are one and the same media.

Prior to operation of the charging mode, optional isolation valves 40 and 42 may be opened (if present), and optional isolation valves 41 and 43 may be closed (if present). Optional three way valves 32 and 33 may be set to either divert the second heat transfer fluid 28 solely to the refrigeration condenser 21, or to a suitable position if some additional heat source is also to be utilised (via heat exchanger 31), from the second reservoir 3 when pump 29 is operated. The hot side thermal storage liquid will be fully at its lowest storage temperature if the second reservoir 3 was fully discharged during previous operation of the second discharge mode (i.e. during operation of the second discharge mode) and if no additional heat had been added since via heat exchanger 31.

Upon operation in the charging mode, the heat pump 1 is energized to drive the refrigeration compressor 19. This heats and pressurises gaseous refrigerant within the heat pump 1 prior to entering the refrigeration condenser 21 and supplying heat to the second heat transfer fluid 28 that is being circulated via pump 29 through the other side of the refrigeration condenser 21. Giving up heat to the second heat transfer fluid 28 condenses the heat pump refrigerant to a liquid phase which then enters the refrigeration expansion valve 22 which reduces its pressure and correspondingly its boiling point. The refrigerant entering the refrigeration evaporator 20 is boiled as it extracts heat from the first heat transfer fluid 25 being circulated through the other side of the refrigeration evaporator 20 via the pump 26.

Operation of the charging mode may preferably continue until the instance when all the cold side thermal storage liquid has reached its lowest storage temperature. This will be indicated (and is therefore detectable) by the temperature of the first heat transfer fluid 25 reaching a pre-determined level.

It is possible, but not essential, to tune the mass of the hot side thermal storage liquid in the second reservoir 3 such that the instance when all of the cold side thermal storage liquid is fully cooled coincides with the instance when all of the hot side thermal storage liquid is fully heated. In practical terms, and to allow for optional waste heat recovery from alternative sources, the mass of hot side thermal storage liquid may be in excess of this value without affecting system performance in anyway.

It is preferable, though not essential, that the temperature in the first and second reservoirs 2,3 be homogenised throughout operation of the charging mode. This may be achieved by agitating the first and second reservoirs 2,3 e.g. by recirculating the first and second heat transfer fluids 25,28, or by other means (aeration, mechanical stirrers etc.), and controlling the operation of the heat pump 1 such that the condensing temperature in the heat pump 1 is marginally above the bulk second reservoir 3 temperature at any point, and the evaporation temperature in the heat pump 1 is marginally lower than the bulk first reservoir 2 temperature at any point. This charging process will ensure that the average coefficient of performance of the heat pump 1 for the charging duration is as high as possible in order to maximise round trip efficiency of the system.

In certain embodiments, during operation of the storage mode, the heat pump 1 may not be operated, nor may any component in the first thermodynamic circuit 4.

If the apparatus 600 is operating purely as an energy storage system with no recovery of additional heat sources, the apparatus 600 may be at rest with no component in the second thermodynamic circuit 5 being active.

If additional heat sources are available, the second reservoir 3 can be continually charged by setting optional three way valves 32 and 33 to positions such that operation of pump 29 diverts the second heat transfer fluid 28 through heat exchanger 31 to make use of the continual, or intermittent, heat source during the storage phase.

As with the embodiments described above in relation to FIGS. 3, 4 and 5, discharge of the first and second thermodynamic circuits 4,5 can be done independently or simultaneously depending on local power requirements. That is, a first discharge mode may permit the discharging of the first thermodynamic circuit 4, and a second discharge mode may permit the discharging of the second thermodynamic circuit 5. The first and second expanders 6,11 may be at rest prior to discharge, or they may be motored such that they are at operating speed before introduction of the first and second working fluids 23,24. In embodiments where instantaneous power may be required, capacitive storage 53 can be included in the drive/power electronics 52 to provide an instantaneous supply (see FIG. 10). In alternative embodiments, other additional non-thermal energy storage means may be provided which may, for example, be mechanical or electrical. For example, the additional non-thermal energy storage means may be a flywheel or a battery.

Prior to operation of the first discharge mode, the three-way valve 27 is positioned such that operation of pump 26 diverts the first heat transfer fluid 25 through the first condenser 7.

Upon operation of the first discharge mode, pump 8 pumps the first working fluid 23 into the first evaporator 9 where it is heated and evaporated by heat from the first auxiliary source 10. In certain non-limiting embodiments, the auxiliary heat source 10 may be an ambient heat source. The first working fluid 23 then passes through optional heat exchanger 36 to pick up any residual heat from the second working fluid 24 as it exits the second expander 11 (if the second discharge mode is operating also). This heats the gaseous first working fluid 23 further (e.g. superheats it), or alternatively could be used to raise the temperature at which the first working fluid 23 is evaporated by pushing the liquid/vapour level into this heat exchanger 36 (if thermodynamically favourable), prior to entry into the first expander 6.

Before entry into the first expander 6, the first working fluid 23 may pass through optional heat exchanger 16 if an additional heat source 30 is available. This heats the gaseous first working fluid 23 further (e.g. superheats it), or alternatively could be used to raise the temperature at which the first working fluid 23 is evaporated by pushing the liquid/vapour level into this heat exchanger 16 (if thermodynamically favourable), prior to entry into the first expander 6.

The gaseous first working fluid 23 enters the first expander 6 and, due to the pressure difference across the first expander 6 (set by the condensing pressure in first condenser 7 and the heat source use to evaporate the first working fluid 23), the first working fluid 23 drives the first expander 6 (as it expands) converting the energy extracted from the heat source in the first evaporator 9 (and optionally heat exchangers 36 and 16) to electrical or mechanical energy.

The first working fluid 23 exits the first expander 6 whilst still in a gaseous state and enters the first condenser 7. Pump 26 pumps the first heat transfer fluid 25 from the first reservoir 2 into first condenser 7. This puts the first working fluid 23 in thermal contact with the first reservoir 2, which condenses the first working fluid 23 as the cold heat transfer fluid 25 absorbs heat from it. The condensed first working fluid 23 then may optionally first enter the buffer storage 37 (if present) and then enter pump 8, or be drawn into pump 8 once more for the cycle to continue. The first heat transfer fluid 25 leaving the first condenser 7 is returned to the first reservoir 2 where it exchanges heat with and heats the cold side thermal storage liquid, as the first discharge mode is operated.

The first discharge mode can be progressed to partially or fully heat the cold side thermal storage liquid and still allow the next operation of the charging mode to commence from whatever bulk temperature is reached on homogenisation. Either way, full depletion of the first reservoir 2 may be indicated by detection of a rise in temperature of the first heat transfer fluid 25 in, or exiting, the first reservoir 2.

It is advantageous, but not essential, that the cold side thermal storage liquid be drawn from the bottom of the first reservoir 2 (which may be a tank, for example), during operation of the first discharge mode, and returned to the top of the first reservoir 2 at a flow rate that allows the thermal storage liquid in the first reservoir 2 to stratify such that the liquid drawn off is always at the lowest storage temperature, and is returned to the first reservoir 2 at the highest storage temperature. This will result in the lowest possible condensing pressure for the first working fluid 23 in the first condenser 7 and thus maximise the enthalpy change across the first expander 6.

Prior to operating the second discharge mode, optional isolation valves 41 and 43 may be opened (if present). Optional isolation valves 40 and 42 may be closed (if present) if no additional heat input is available via heat exchanger 31 during operation of the second discharge mode. If additional heat sources are available, the second reservoir 3 can be continually charged by setting optional three way valves 32 and 33 to positions such that operation of pump 29 diverts the second heat transfer fluid 28 through heat exchanger 31 to make use of the continual heat source during the operation of the second discharge mode and by leaving optional isolation valves 40 and 42 open. This allows for simultaneous charging of the second reservoir 3 and operation of the second discharge mode without operation of the heat pump 1.

Upon operation of the second discharge mode, the pump 39 is operated to circulate the second heat transfer fluid 28 from the second reservoir 3 to the second evaporator 14. On exiting the second evaporator 14, the second heat transfer fluid 28 is returned to the second reservoir 3 to allow for continual circulation. Pump 13 is operated to pump the second working fluid 24 into the other side of the second evaporator 14 where it is evaporated using the heat from the second heat transfer fluid 28.

The second working fluid 24 exits the second evaporator 14, and before entry into the second expander 11, it may pass through optional heat exchanger 18 if an additional/waste heat source 30 is available. This heats the gaseous second working fluid 24 further (e.g. adding superheat), or alternatively could be used to raise the temperature at which the second working fluid 24 is evaporated by pushing the liquid/vapour level into this heat exchanger 18 (if thermodynamically favourable), prior to entry into the second expander 11.

The gaseous second working fluid 24 enters the second expander 11 and, due to the pressure difference across the expander (set by the condensing pressure of the second working fluid 24 in the second condenser 12 and the heat source used to evaporate the second working fluid 24), the second working fluid 24 drives the second expander 11 (as it expands) converting the energy extracted from the second heat transfer fluid 28 (and optionally heat exchanger 18) to electrical or mechanical energy.

On exiting the second expander 11, the second working fluid 24 is still gaseous and may then enter optional heat exchanger 36 where it can exchange any residual heat that would be advantageous to the first working fluid 23 if the first discharge mode is being operated at the same time.

The second working fluid 24 then enters the second condenser 12 where it is condensed by the auxiliary heat sink 15 on the other side of the second condenser 12. In certain non-limiting embodiments, the auxiliary heat sink may be an ambient heat sink.

Alternatively, if it were thermodynamically advantageous, the apparatus 600 could be configured such that the second working fluid 24 is condensed in the optional heat exchanger 36 and then subcooled in the second condenser 12.

The condensed second working fluid 24 then may optionally first enter the buffer storage 38 (if present) and then enter pump 13, or be drawn directly into pump 13 for the cycle to continue and be pumped back into the second evaporator 14 via optional heat exchanger 17 where an alternative/waste heat source 30 can preheat the working fluid 24, if available.

Operation of the second discharge mode gradually causes cooling of the hot side thermal storage liquid as the second working fluid 24 absorbs heat from it via the second heat transfer fluid 28 as it evaporates.

Operation of the second discharge mode can be progressed to partially or fully cool the second reservoir 3 and allow the next operation of the charging mode to commence from whatever bulk temperature is reached on homogenisation. Either way, full depletion of the second reservoir 3 may be indicated by (and therefore detected) by a fall in temperature of the second heat transfer fluid 28 in, or exiting, the second reservoir 3.

It is advantageous, but not essential, that the hot side thermal storage liquid be drawn from the top of the second reservoir 3 (which may be a tank, for example), during operation of the second discharge mode, and returned to the bottom of the second reservoir 3 at a flow rate that allows the thermal storage liquid in the second reservoir 3 to stratify such that the liquid drawn off is always at the highest storage temperature, and is returned to the second reservoir 3 at the lowest storage temperature. This will result in the highest possible evaporation pressure for the second working fluid 24 in the second evaporator 14 and thus maximise the enthalpy change across the second expander 11.

Figure 7:
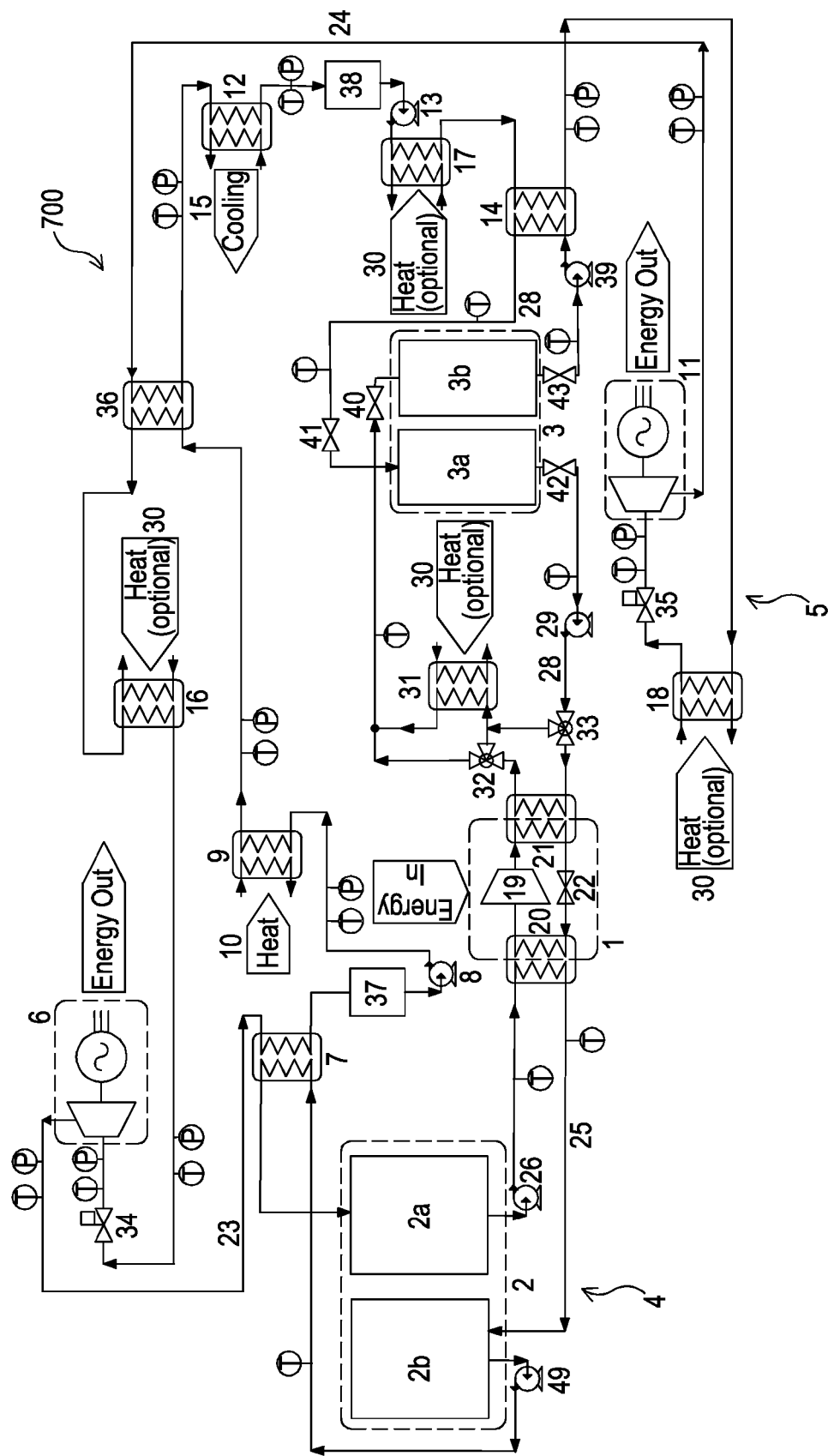
FIG. 7 is a detailed representation of a thermodynamic cycle apparatus according to a further embodiment of the present invention.

FIG. 7 shows a thermodynamic cycle apparatus 700 according to an embodiment of the present invention. In the embodiment of FIG. 7, the first reservoir 2 comprises two separate first vessels 2a,2b and the second reservoir 3 comprises two separate second vessels 3a,3b. The first and second storage media are liquids that do not change phase during normal operation of the apparatus 700. In this manner, heat energy may be stored via sensible heating and cooling in the first and second vessels 2a,2b,3a,3b. As the first storage medium is heated and cooled, it is moved (e.g. pumped) back and forth between the two first vessels 2a,2b. Similarly, as the second storage medium is heated and cooled, it is moved (e.g. pumped) back and forth between the two second vessels 3a,3b.

Figure 8:
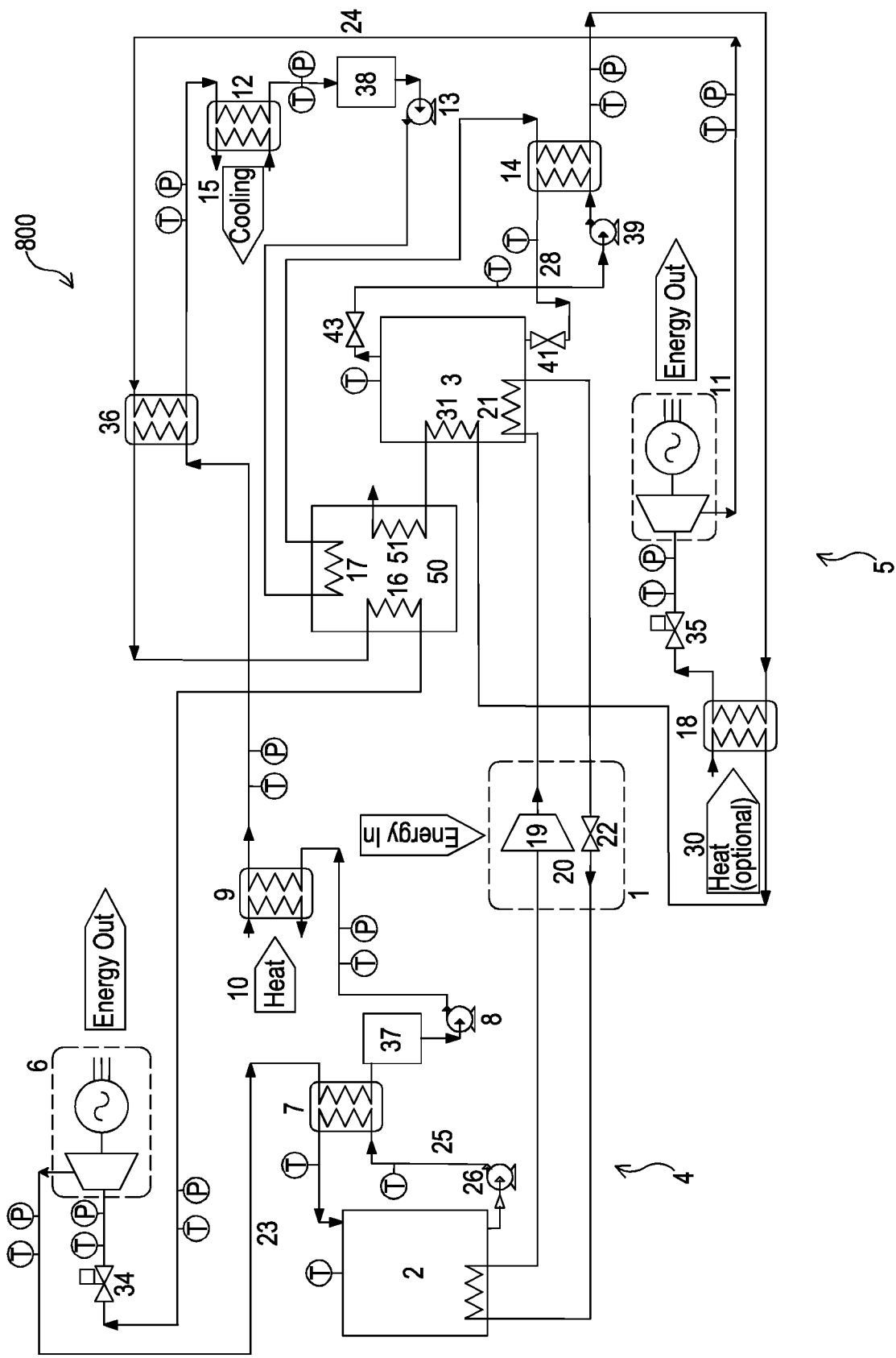
FIG. 8 is a detailed representation of a thermodynamic cycle apparatus according to a further embodiment of the present invention.

FIG. 8 shows a thermodynamic cycle apparatus 800 according to an embodiment of the present invention. In the embodiment of FIG. 8, a third reservoir 50 is provided that serves as an intermediary temperate thermal store. Each of the first reservoir 2, second reservoir 3 and third reservoir 50 comprises a storage tank with one or more heat exchangers therein. The embodiment of FIG. 8 exemplifies how, with some simplification, placing heat exchangers into the tanks permits some auxiliary pumping loads to be eliminated. Additionally, waste heat exiting the second reservoir 3 may be captured in the third reservoir 50. These features may be included in any of the above-described embodiments. In the specific embodiment of FIG. 8, the first and second storage media are liquid media that does not change phase during normal operation of the apparatus 800. In this manner, heat energy may be stored via sensible heating and cooling in the first and second reservoirs 2,3.

Figure 9:
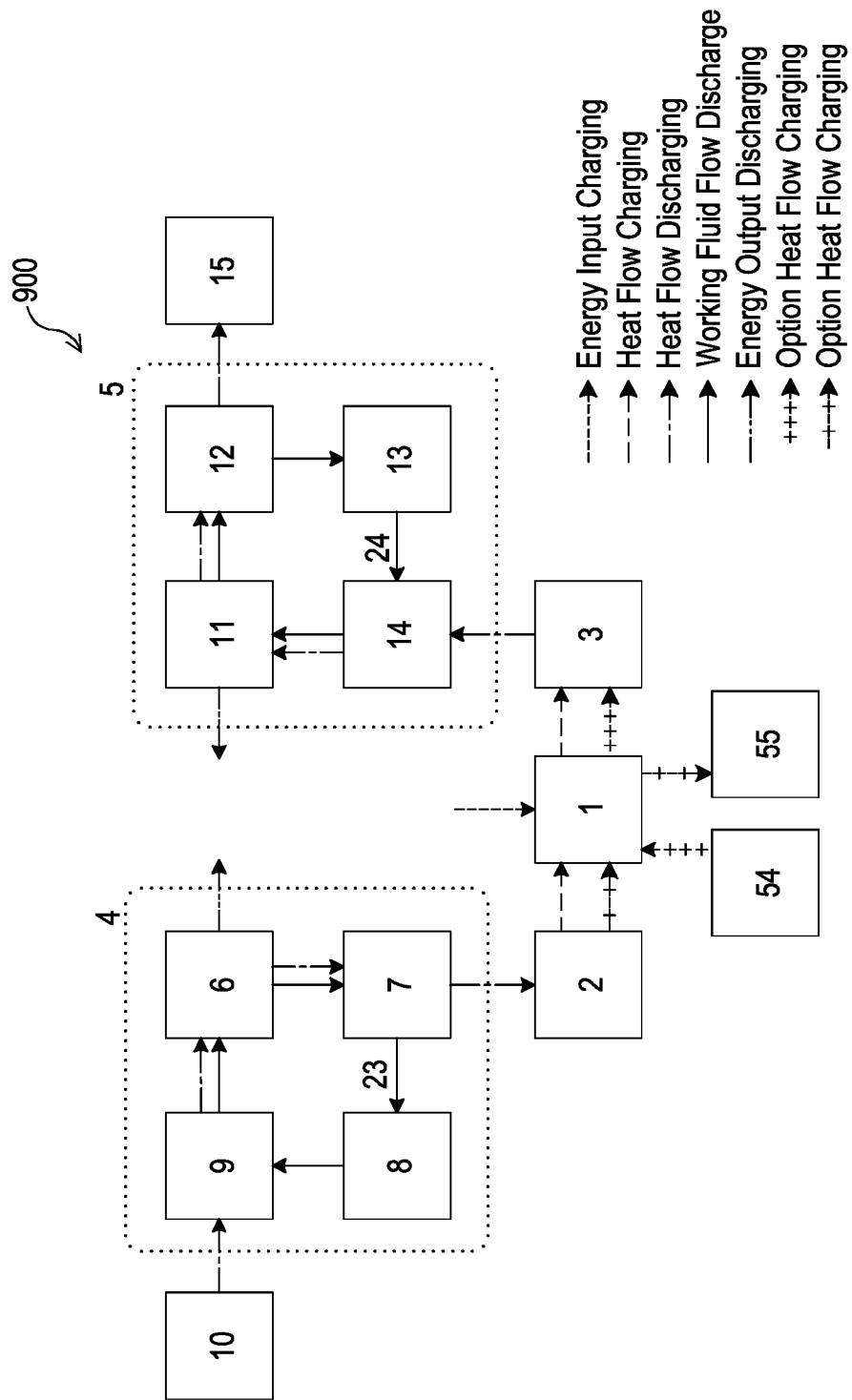
FIG. 9 is a schematic representation of a thermodynamic cycle apparatus according to a further embodiment of the present invention.

FIG. 9 schematically shows a thermodynamic cycle apparatus 900 according to an embodiment of the present invention. The apparatus 900 of FIG. 9 is identical to the apparatus 100 of FIG. 1 but additionally includes a heat source 54 and a heat sink 55. As such, additional components 54 and 55, and the associated operation (described below) may be incorporated into any of the above-described embodiments.

The heat source 54 permits the heat pump 1 to be operated and heat the second reservoir 3 without drawing heat from the first reservoir 2. This arrangement may be used if the apparatus 900 was previously operated in the second discharge mode without the first discharge mode being operated (i.e. to "recharge" the second reservoir 3).

The heat sink 55 permits the heat pump 1 to be operated to cool the first reservoir 2 without heating the second reservoir 3. This arrangement may be used if the apparatus 900 was previously operated in the first discharge mode without the second discharge mode being operated (i.e. to "recharge" the first reservoir 2).

Figure 10:
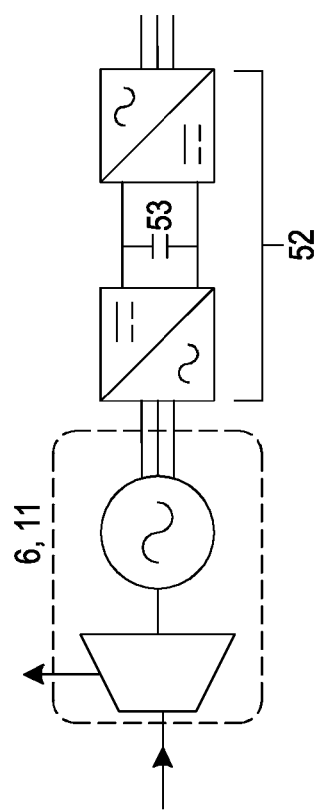
FIG. 10 is a schematic representation of power electronics that may be utilised by embodiments of the present invention.

FIG. 10 schematically shows power electronics 52 that may be utilized in certain embodiments of the present invention. The power electronics 52 are shown electrically connected to an expander generator, which may include either of the first expander 6 or second expander 11. The power electronics 52 is configured to condition the power generator of the expander generator 6,11 and handle any connection protocols to the local grid. Capacitive storage 53 (e.g. a capacitor) is provided and may serve to reduce the time between power being demanded and power being delivered where a DC voltage bus exists between stages. The power electronics 52 may also be utilized to drive the expander-generator 6,11 to allow faster start up times when power is demanded. In alternative embodiments, other additional non-thermal energy storage means may be provided in place of or in addition to the capacitive storage 53 which may, for example, be mechanical or electrical. For example, the additional non-thermal energy storage means may be a flywheel, compressed air (or other gas) or a battery.

In certain embodiments, the storage temperatures of the first and second storage media (in the first and second reservoirs 2,3) may be 200° C. or less, 100° C. or less, −50° C. or more and/or −30° C. or more. In certain embodiments, the difference between the storage temperature of the first storage medium and the storage temperature of the second storage medium may be between 30° C. and 120° C. In certain embodiments the difference between the storage temperature of the first storage medium and the storage temperature of the second storage medium may be between 30° C. and 60° C., or approximately 50° C., or between 80° C. and 120° C., or approximately 100° C. For example, the storage temperature in the first reservoir may be about 0° C. and the storage temperature in the second reservoir may be about 50° C. Therefore, embodiments of the present invention may operate at modest, sensible temperatures in contrast to many prior art arrangements which require high temperatures of several hundred degrees Celsius, and low temperatures at −100° C. or lower. The present invention may achieve this, in certain embodiments, by utilizing abundant and freely available heat sources such as ambient, environmental and waste heat. In such embodiments, a low conversion efficiency of a plentiful heat source overcomes the thermodynamic losses incurred by operating at relatively modest temperatures. By providing the ability to independently discharge the energy stored in the first reservoir relative to the energy stored in the second reservoir, the engineering of the apparatus is greatly simplified. This means such an apparatus can be assembled from readily available components and deliver an attractive round trip efficiency and at a low capital cost.

In certain non-limiting embodiments, the heat sources used for adding heat in components 9, 16, 31, 18 (which are heat exchangers) may be selected from: external ambient air sources, air sources from inside buildings and dwellings to be air conditioned, heat rejected from existing air conditioning or refrigeration systems, ambient water sources (e.g. brine, sea water, brackish water, lakes, ponds, rivers, canals, aqueducts), ground source, geothermal, solar thermal, solar ponds, biologically active heat sources (e.g. anaerobic digesters, aerobic digesters, compost heaps, dung heaps, sewage streams, secondary sewage sludges), waste heat from industrial processes, and waste heat from other generation technologies (e.g. CCGT, steam turbines etc.).

In embodiments that utilise "ambient" heat as a source and sink for the first evaporator 9 and the second condenser 12, these needn't be the same ambient source, or be at the same temperature (i.e. using run of river for the auxiliary heat sink 15 might result in a lower temperature compared with an air source which might be employed as auxiliary heat source 10).

In certain embodiments, the first and/or second expanders 6,11 may be selected from: radial, axial, or impulse (or other) turbines/turboexpanders, scroll expanders, screw expanders, Tesla turbines, and reciprocating engines In certain embodiments, the above-described pumps 26, 8, 46, 29, 39, 13, 49 may each be a pump selected from: centrifugal pumps, sliding vane pumps, gerotor pumps, geroller pumps, gear pumps, diaphragm pumps, piston pumps, plunger pumps, peristaltic pumps, and lobe pumps.

In certain embodiments, (e.g. if simultaneous charging and discharging of the second reservoir 3 is not required), pumps 29 & 13 can be replaced with a single pump in the embodiment described above in relation to FIG. 3, or pumps 29 & 39 can be replaced with a single pump in the embodiments described above in relation to FIGS. 4, 5, 6 and 7.

In certain embodiments (e.g. where independent charge of the first and second reservoirs 2,3 and independent first and second discharge modes are not required) the first and second expanders 6,11 could be coupled on a common shaft to a single generator.

In some embodiments, pumps that are required to run during the operation of the discharge mode could be coupled on a common shaft with one or both of the expanders 6,11 to improve system efficiency.

In preferable embodiments, encapsulation materials for the PCMs and any fluids that come in to contact with them may be selected to be compatible with one another.

To prevent liquid phase working fluids entering the first and/or second expanders 6,11, apparatuses according to certain embodiments may be operated with the first and second working fluids being introduced to their respective expanders 6,11 with a controlled margin of superheat.

The working fluid levels in the first and second thermodynamic circuits may be controlled to provide sufficient subcooling to prevent cavitation damage to pumps.

The criteria for selecting suitable PCMs may include any or all of: their melting point, chemical compatibility with any materials they may come into contact with, chemical inertness, stability, cost, and safety.

The criteria for selecting suitable first and second working fluids may include any or all of: the temperatures of the heat sources and sinks, the storage temperatures of the PCMs, cost, safety, stability, inertness, chemical compatibility and their temperature-entropy characteristics as a refrigerant.

In certain embodiments, the apparatus may be modular. Either or both of the first reservoir 2 or second reservoir 3 may comprise two or more tanks that may be manifolded together to produce a scalable system.

In applications where additional cooling sources may be available (e.g. waste cold from industrial or cryogenic processes, expanding gases) additional heat exchangers may be included after the second condenser 12 in the second thermodynamic circuit 5, after the first condenser 7 in embodiments described above in relation to FIGS. 4, 5, 6, 7 and 8, and prior to entry into pump 8 in the embodiment described above in relation to FIG. 3, to either supress the condensing pressure of the respective working fluids further or to add additional subcooling to the working fluids before entering the working fluid pumps.

If a heat source is available in an application that is at a temperature significantly above the second reservoir 3 thermal storage temperature, an additional thermal store, or stores (i.e. one or more additional reservoirs or reservoir vessels), could be utilised to store this heat source at a higher temperature using a storage medium with a higher storage temperature(s). This could then be utilised such that an initial second reservoir vessel heats the liquid second working fluid to a temperature at which it is still liquid, then evaporation of the second working fluid is conducted utilising heat stored in a secondary second reservoir vessel. Alternatively, this could be utilised such that the initial second reservoir is used to evaporate the second working fluid and then the secondary second reservoir vessel is used to superheat the second working fluid prior to entry into the second expander. This may also be utilised as an additional heat source to evaporate or superheat the first working fluid.

If cooling sources are available in an application that is at a temperature significantly below the first reservoir 2 storage temperature, an additional thermal store, or stores (i.e. one or more additional reservoirs or reservoir vessels), could be utilised to store this at a lower temperature using a storage medium with a lower storage temperature. This can then be utilised such that an initial first reservoir vessel is used to cool the first working fluid to a temperature where it remains gaseous, and then secondary first reservoir vessel is utilised to condense the first working fluid to a lower condensing pressure. Alternatively, this could be utilised such that the initial first reservoir vessel condenses the first working fluid and the secondary first reservoir vessel subcools it prior to entry into pumps. This may also be utilised as an additional heat sink to condense or subcool the second working fluid. In certain embodiments, waste cooling may be used to further cool (and hence "charge") the first reservoir 2.

In embodiments where the first and/or second storage media comprises an unencapsulated PCM, the unencapsulated PCM may be stored as a fragmentable solid (as opposed to a slurry, for example). A fragmentable solid is a solid that is capable of being fragmented such that it may be separated.

In accordance with embodiments of the present invention, the heat pump 1 may be electrically drivable. However, in other embodiments, the apparatus may be used to store energy of other forms, provided that such other forms may be utilised to energise the heat pump (e.g. mechanical energy, gas driven systems etc.).

In certain embodiments, to aid in faster start up times with fast response expander generators, the lines/pipework to the first/second expanders can be kept pressurised with gaseous first/second working fluids such that when the regulators/valves 34 and 35 are opened there are no transport delays in the gas reaching the first/second expanders.

Any suitable combination of the above-described embodiments may be made within the scope of the present invention and protection for such combinations is hereby sought. For example, specific combinations and embodiments ("configurations") are listed in the table below, where "cold side" comprises features thermally connected to the cold side of the heat pump 1, and "hot side" comprises features thermally connected to the hot side of the heat pump 1. References to Figures specify the cold/hot side features depicted in the referenced Figure and/or the features described above in respect of the referenced Figure.

|  | Cold Side | Hot Side |
| --- | --- | --- |
| Configuration 1 | FIG. 3 | FIG. 3 |
| Configuration 2 | FIG. 3 | FIG. 4 |
| Configuration 3 | FIG. 3 | FIG. 5 |
| Configuration 4 | FIG. 3 | FIG. 6 |
| Configuration 5 | FIG. 3 | FIG. 7 |
| Configuration 6 | FIG. 4 | FIG. 3 |
| Configuration 7 | FIG. 4 | FIG. 4 |
| Configuration 8 | FIG. 4 | FIG. 5 |
| Configuration 9 | FIG. 4 | FIG. 6 |
| Configuration 10 | FIG. 4 | FIG. 7 |
| Configuration 11 | FIG. 5 | FIG. 3 |
| Configuration 12 | FIG. 5 | FIG. 4 |
| Configuration 13 | FIG. 5 | FIG. 5 |
| Configuration 14 | FIG. 5 | FIG. 6 |
| Configuration 15 | FIG. 5 | FIG. 7 |
| Configuration 16 | FIG. 6 | FIG. 3 |
| Configuration 17 | FIG. 6 | FIG. 4 |
| Configuration 18 | FIG. 6 | FIG. 5 |
| Configuration 19 | FIG. 6 | FIG. 6 |
| Configuration 20 | FIG. 6 | FIG. 7 |
| Configuration 21 | FIG. 7 | FIG. 3 |
| Configuration 22 | FIG. 7 | FIG. 4 |
| Configuration 23 | FIG. 7 | FIG. 5 |

|                  | Cold Side | Hot Side |
| --- | --- | --- |
| Configuration 24 | FIG. 7    | FIG. 6   |
| Configuration 25 | FIG. 7    | FIG. 7   |

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A thermodynamic cycle apparatus comprising:
   (i) a first reservoir containing a first storage medium;
   (ii) a second reservoir containing a second storage medium;
   (iii) a heat pump having a cold side thermally coupled to the first reservoir for cooling the first storage medium and a hot side thermally coupled to the second reservoir for heating the second storage medium;
   (iv) a first thermodynamic circuit of a first working fluid, the first thermodynamic circuit comprising:
      a first evaporator for evaporating the first working fluid to create a first pressurized vapor;
      a first expander arranged to expand the first pressurized vapor; and
      a first condenser arranged to condense first working fluid received from the first expander and provide first working fluid to the first evaporator, the first condenser being thermally coupled to the first reservoir;
   (v) a second thermodynamic circuit of a second working fluid, the second thermodynamic circuit comprising:
      a second evaporator for evaporating the second working fluid to create a second pressurized vapor, the second evaporator being thermally coupled to the second reservoir;
      a second expander arranged to expand the second pressurized vapor; and
      a second condenser arranged to condense second working fluid received from the second expander and provide second working fluid to the second evaporator;
   (vi) an auxiliary heat input means thermally connected to the first thermodynamic circuit so that auxiliary heat contributes to the creation of the first pressurized vapor; and
   (vii) an auxiliary heat output means thermally connected to the second thermodynamic circuit so that the second working fluid loses heat to an auxiliary heat sink;
   the first thermodynamic circuit being thermally independent of the second thermodynamic circuit, and the apparatus is operable in a charging mode, a storage mode, and a discharge mode;
   in the charging mode, the heat pump being energized to cool the first storage medium and heat the second storage medium;
   in the storage mode, the cooled first storage medium being stored in the first reservoir and heated second storage medium is stored in the second reservoir; and
   in the discharge mode, at least one of the first pressurized vapor being expanded by the first expander and the second pressurized vapor being expanded by the second expander.

2. The apparatus of claim 1, wherein at least one of the first expander and second expander comprises one of a turbine, scroll expander, screw expander, Tesla turbine, or a reciprocating engine.

3. The apparatus of claim 1, wherein at least one of the first expander and second expander comprises an expander-generator for generating electricity.

4. The apparatus of claim 1, wherein at least one of the first and second thermodynamic circuits includes a pump for circulating first or second working fluid.

5. The apparatus of claim 1, further comprising an auxiliary heat source for providing the auxiliary heat to the first thermodynamic circuit via the auxiliary heat input means, the auxiliary heat source comprising at least one of: an external ambient air source, an air source from inside a building, heat rejected from an air conditioning or refrigeration system, an ambient water source, a ground source, a geothermal source, a solar thermal source, a solar pond, a biologically active heat source, waste heat from an industrial process, and waste heat from generation technology.

6. The apparatus of claim 1, further comprising an auxiliary heat sink for receiving heat from the second thermodynamic circuit via the auxiliary heat output means the auxiliary heat sink comprising at least one of: an external ambient air source, an air source from inside a building, an ambient water source, a ground source, and waste cooling sources.

7. The apparatus of claim 1, wherein the second thermodynamic circuit comprises an additional auxiliary heat input means so that additional auxiliary heat contributes to the creation of the second pressurized vapor.

8. The apparatus of claim 1, further comprising a first superheater between the first evaporator and the first expander, the first superheater being arranged to superheat the first working fluid.

9. The apparatus of claim 1, further comprising a second superheater between the second evaporator and the second expander, the second superheater being arranged to superheat the second working fluid.

10. The apparatus of claim 1, further comprising a preheater between the second condenser and the second evaporator, the preheater being configured to heat the second working fluid.

11. The apparatus of claim 1, wherein at least one of the first storage medium and the second storage medium comprises an encapsulated phase change material or an unencapsulated phase change material.

12. The apparatus of claim 1, wherein the cold side of the heat pump is thermally coupled to the first reservoir by a first heat transfer circuit of a first heat transfer fluid.

13. The apparatus of claim 1, wherein the first storage medium comprises an unencapsulated phase change material, and the first heat transfer fluid is not miscible in the first storage medium.

14. The apparatus of claim 1, wherein the hot side of the heat pump is thermally coupled to the second reservoir by a second heat transfer circuit of a second heat transfer fluid.

15. The apparatus of claim 1, wherein the first reservoir is thermally coupled to the condenser of the first thermodynamic circuit by a third heat transfer circuit of a third heat transfer fluid.

16. The apparatus of claim 1, wherein the second reservoir is thermally coupled to the evaporator of the second thermodynamic circuit by a fourth heat transfer circuit of a fourth heat transfer fluid.

17. The apparatus of claim 1, wherein the heat pump comprises a refrigeration circuit of a refrigerant wherein the refrigeration circuit includes a refrigeration compressor, a refrigeration evaporator, a refrigeration condenser or gas cooler, and a refrigeration expansion means for expanding the refrigerant; and
the cold side of the heat pump comprising the refrigeration evaporator and the hot side of the heat pump comprising the refrigeration condenser or gas cooler.

18. The apparatus of claim 1, wherein at least one of the first storage medium and the second storage medium comprises a liquid that does not change phase during operation of the apparatus any of the charging mode, the storage mode, and the discharge mode.

19. The apparatus of claim 1, further comprising at least one heat exchanger arranged in at least one of the first reservoir and the second reservoir.

20. The apparatus of claim 1, wherein at least one of the first and second thermodynamic circuits comprises a Rankine cycle, Lorenz cycle or a Kalina cycle.

21. A method of operating a thermodynamic cycle apparatus comprising:
(a) providing a thermodynamic cycle apparatus comprising:
  (i) a first reservoir containing a first storage medium;
  (ii) a second reservoir containing a second storage medium;
  (iii) a heat pump having a cold side thermally coupled to the first reservoir for cooling the first storage medium and a hot side thermally coupled to the second reservoir for heating the second storage medium;
  (iv) a first thermodynamic circuit of a first working fluid, the first thermodynamic circuit comprising:
    a first evaporator for evaporating the first working fluid to create a first pressurized vapor;
    a first expander arranged to expand the first pressurized vapor; and
    a first condenser arranged to condense first working fluid received from the first expander and provide first working fluid to the first evaporator, the first condenser being thermally coupled to the first reservoir; and
  (v) a second thermodynamic circuit of a second working fluid, the second thermodynamic circuit comprising:
    a second evaporator for evaporating the second working fluid to create a second pressurized vapor, the second evaporator being thermally coupled to the second reservoir;
    a second expander arranged to expand the second pressurized vapor; and
    a second condenser arranged to condense second working fluid received from the second expander and provide second working fluid to the second evaporator;
  (vi) an auxiliary heat input means thermally connected to the first thermodynamic circuit so that auxiliary heat contributes to the creation of the first pressurized vapor; and
  (vii) an auxiliary heat output means thermally connected to the second thermodynamic circuit so that the second working fluid loses heat to an auxiliary heat sink;
  the first thermodynamic circuit being thermally independent of the second thermodynamic circuit;
(b) operating the apparatus in a charging mode by energizing the heat pump to cool the first storage medium and heat the second storage medium;
(c) operating the apparatus in a storage mode by storing cooled first storage medium in the first reservoir and storing heated second storage medium in the second reservoir;
(d) operating the apparatus in a first discharge mode by using an auxiliary heat source to create the first pressurized vapor in the first evaporator, expanding the first pressurized vapor with the first expander and condensing the first working fluid in the first condenser; and
(e) operating the apparatus in a second discharge mode by using heat from the second reservoir to create the second pressurized vapor in the second evaporator, expanding the second pressurized vapor and using an auxiliary heat sink to condense the second working fluid in the second condenser;
wherein steps (d) and (e) are performable both concurrently and independently of one another.

22. The method of claim 21, wherein at least one of the first storage medium and the second storage medium comprises an encapsulated phase change material or an unencapsulated phase change material, and the first storage medium comprising an unencapsulated material; and
at least one of:
  the method further comprising storing the first storage medium as a slurry or a fragmentable solid at an end of operation of the charging mode; and
  the second storage medium comprising an unencapsulated material and the method further comprising storing the second storage medium as a slurry or a fragmentable solid at an end of operation of the second discharge mode.

23. The method of claim 21, wherein the first thermodynamic circuit comprises a single-pass heat exchanger; and
the method further comprises, when operating the apparatus in the first discharge mode, discharging the first storage medium through the single-pass heat exchanger and allowing the first storage medium to stratify thereafter.

24. The method of claim 21, wherein the second thermodynamic circuit comprises a single-pass heat exchanger; and
the method further comprises, when operating the apparatus in the second discharge mode, discharging the second storage medium through the single-pass heat exchanger and allowing the second storage medium to stratify thereafter.

25. The method of claim 21, wherein the apparatus comprises additional energy storage means arranged to output energy independently of energy outputted by the first expander and second expander; and
at least one of:
the additional energy storage means includes a capacitor, battery, fly wheel or other non-thermal electrical or mechanical energy storage means; and
the method further comprises using the additional energy storage means to provide an output of electrical energy until energy outputted by at least one of the first and second discharge modes reaches a predetermined amount.

26. The method of claim 21, comprising driving at least one of the first expander and second expander prior to introduction of at least one of the first and second working fluid therein.

27. The method of claim 21, wherein the apparatus comprises first pipework connected to an input of the first expander; and
at least one of:
the method further comprises pressurizing the first pipework with gaseous first working fluid prior to operation of the first discharge mode; and
the apparatus comprises second pipework connected to an input of the second expander, and the method further comprises pressurizing the second pipework with gaseous second working fluid prior to operation of the second discharge mode.

* * * * *